United States Patent
Amick et al.

(10) Patent No.: US 11,737,459 B2
(45) Date of Patent: *Aug. 29, 2023

(54) USE OF NOOTKATONE TO KILL SAP-SUCKING INSECTS

(71) Applicant: EVOLVA SA, Reinach (CH)

(72) Inventors: Jean Davin Amick, Lexington, KY (US); Bryan N. Julien, Lexington, KY (US); Henrik Meyer, Dronningmolle (DK)

(73) Assignee: EVOLVA SA, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/086,501

(22) PCT Filed: Mar. 24, 2017

(86) PCT No.: PCT/EP2017/057138
§ 371 (c)(1),
(2) Date: Sep. 19, 2018

(87) PCT Pub. No.: WO2017/162887
PCT Pub. Date: Sep. 28, 2017

(65) Prior Publication Data
US 2019/0069543 A1 Mar. 7, 2019

Related U.S. Application Data

(60) Provisional application No. 62/352,669, filed on Jun. 21, 2016, provisional application No. 62/313,001, filed on Mar. 24, 2016.

(51) Int. Cl.
*A01N 35/06* (2006.01)
(52) U.S. Cl.
CPC .................................. *A01N 35/06* (2013.01)
(58) Field of Classification Search
CPC ...................................................... A01N 35/06
See application file for complete search history.

(56) References Cited

U.S. PATENT DOCUMENTS

| | | | |
|---|---|---|---|
| 4,800,196 A | 1/1989 | Nomura et al. | |
| 5,317,041 A | 5/1994 | Chapman et al. | |
| 5,847,226 A | 12/1998 | Muller et al. | |
| 5,916,917 A | 6/1999 | Suh et al. | |
| 6,107,341 A | 8/2000 | Hansen et al. | |
| 6,124,275 A | 9/2000 | Emerson | |
| 6,531,303 B1 | 3/2003 | Millis et al. | |
| 6,685,948 B1 | 2/2004 | Zeng et al. | |
| 6,689,593 B2 | 2/2004 | Millis et al. | |
| 6,808,717 B1 | 10/2004 | Bale | |
| 7,129,271 B2 | 10/2006 | Maupin | |
| 7,442,785 B2 | 10/2008 | Chappell et al. | |
| 8,551,510 B2 | 10/2013 | Bedoukian | |
| 2004/0249219 A1 | 12/2004 | Saucy et al. | |
| 2005/0176818 A1 | 8/2005 | Maupin et al. | |
| 2005/0187289 A1* | 8/2005 | Dolan | C07C 49/21 514/457 |
| 2007/0192986 A1 | 8/2007 | Garcia et al. | |
| 2010/0151519 A1 | 6/2010 | Julien et al. | |
| 2012/0246767 A1 | 9/2012 | Amick et al. | |
| 2015/0007368 A1 | 1/2015 | Saran et al. | |
| 2015/0250166 A1 | 9/2015 | Goldblum et al. | |
| 2019/0098897 A1 | 4/2019 | Amick et al. | |

FOREIGN PATENT DOCUMENTS

| | | |
|---|---|---|
| EP | 1033076 | 9/2000 |
| EP | 1083233 A1 | 3/2001 |
| EP | 2537926 | 12/2012 |
| JP | H10-87409 | 4/1998 |
| WO | 01/28343 A1 | 4/2001 |
| WO | 02/50053 A2 | 6/2002 |
| WO | WO2010/126576 | 11/2010 |
| WO | 2014/031790 A1 | 2/2014 |

OTHER PUBLICATIONS

Fishel, F., Using Your Handhed Lawn and Garden Sprayer, 2009, University of Florida Institute of Food and Agricultural Sciences, pp. 1-4. (Year: 2009).*
Dancewicz, K., Deterrent Activity of (+) −Nootkatone and Its Derivatives Towards the Peach Potato Aphid (Nyzus Persicae Sulzer), 2012, English Translation obtained Nov. 2020. Translated by LinguaLinx Language Solutions, Inc., 14 pages. (Year: 2012).*
Lim, T.K., Cyperus rontundus, 2016, Edible Medicinal and Non-Medicinal Plants, vol. 10, Modified Stems, Roots, Bulbs, (e-book), pp. 183-208. (Year: 2016).*
International Search Report and Written Opinion for Int. App. No. PCT/EP2017/057138, dated Jun. 13, 2017.
Dancewicz, K., et al., "Deterrent activity of (+)−nootkatone and its derivatives towards the peach potato aphid (Myzus persicae Sulzer)," Progress in plant protection, 2012, vol. 52, Nr:5, pp. 221-225.
Miao, L., et al. "Vetiver oil and nootkatone effects on the growth of pea and citrus," Industrial Crops and Products, 2006, vol. 23, Nr:3, pp. 327-332.
Audrain et al.: "Allergy to oxidized limonene and linalool is frequent in the U.K.", British Journal of Dermatology, vol. 171, No. 2 (2014).
"Flavors Fragrance Compendium," Bedoukian Research, 169 pages https://search.bedoukian.com/ftavorfragrance/downloads/catalog_ff.pdf.
"Orange oil" Wikipedia, Wikimedia Foundation, Nov. 29, 2019, https://en.wikipedia.org/w/index.php?title=Orange_oil&oldid=9284 74807.
Written Opinion of the International Searching Authority for PCT/EP2017/072027 dated Dec. 12, 2017, pp. 1-7.
Behle, Robert W., et al., "A Formulation to Encapsulate Nootkatone for Tick Control," Journal of Medical Entomology, 2011, vol. 48, Nr:6, pp. 1120-1127.

(Continued)

*Primary Examiner* — Alton N Pryor
(74) *Attorney, Agent, or Firm* — Hoxie & Associates LLC

(57) ABSTRACT

Compositions comprising nootkatone and a carrier as well as methods for treating and preventing infestations of sap-sucking insects in plants are disclosed herein.

14 Claims, 4 Drawing Sheets
Specification includes a Sequence Listing.

(56) References Cited

OTHER PUBLICATIONS

Bomgardner, "Nootkalone tested as a mosquito repellent" CSEN Global Enterprise (ACS Publication) (2016) vol. 94 (44), p. 10.

Chang, J. H. et al., "Effect of Application of Benzyl Benzoate on House Dust Mile Allergen Levels," Annals of Allergy, Asthma & Immunology, 1996, vol. 77, Nr:3, pp. 187-190.

Chen, Xu Bo et al. "Essential Oil Composition and Larvicidal Activity of Clinopodium gracile (Benth) Matsum Labiatae) Aerial Parts against the Aedes albopictus Mosquito" Tropical Journal of Pharmaceutical Research (2013) vol. 12(5), pp. 799-804.

Dolan, Marc C., et al., "Ability of Two Natural Products, Nootkatone and Carvacrol, to Suppress Ixodes scapularis and Amblyomma americanum (Acari: Ixodidae) in a Lyme Disease Endemic Area of New Jersey," Journal of Economic Entomology, 2009, vol. 102, Nr:6, pp. 2316-2324.

Flor-Weiler, Lina B., et al., "Susceptibility of Four Tick Species, Amblyomma americanum, Dermacentor variabilis, ixodes scapularis, and Rhipicephalus sanguineus (Acari: Ixodidae), to Nootkatone From Essential Oil of Grapefruit," Journal of Medical Entomology, 2011, vol. 48, Nr:2, pp. 322-326.

Gionfriddo et al. "Elimination of Furocoumarins in Bergamot Peel Oil," Perfumer & Flavorist, 29:48-52 (2004).

Hamdan et al. "Anti-inflammatory, insecticidal and antimicrobial activities and chemical composition of the essential oils of different plant organs from navel orange (*Citrus sinensis* (L.) Osbeck var. Malesy) grown in Egypt" Journal of Medicinal Plants Research (2013) vol. 7(18), pp. 1204-1215.

Kardarohman, et al. "Biolarvicidal of Veliver Oil and Ethanol Extract of Veliver Root Distillation Waste Veliveria zizanoides) Effectiveness toward Aedes aegypti, *Culex* sp., and Anopheles sundaicus" Journal of Essential Oil-Bearing Plants (2013) vol. 16(6), pp. 749-762.

Karlberg et al., "Contact allergy to oxidized D-limonene among dermatitis patients", Contact Dermatitis, p. 201-206 (1997).

Letizia, C. S. et al., "Nootkatone," Food and Chemical Toxicology, vol. 38, Supplement 3, 2000, pp. s165-s167.

Mcallister et al., "Mode of Action for Natural Products Isolated From Essential Oils of Two Trees Is Different From Available Mosquito Adulticides" Journal of Medical Entomology (2010) vol. 47(6), pp. 1123-1126.

National Center for Biotechnology Information. PubChem Database. Limonene, CID=22311, https://pubchem.ncbi.nlm.nih.gov/compound/Limonene (accessed on Apr. 28, 2020).

Nootkatone Safety Data Sheet—Bedoukian Research 2015 at http://search.bedoukian.com/product_images/mxts/801_English_SDS_US.pdf (retrieved from the internet Dec. 29, 2019) (2015).

Nootkatone Sigma-Aldrich Product No. 74437 at https://www.sigmaaldrich.com/catalog/product/aldrich/74437?lang=en&region=US&cm_sp=Insite-_-caContent_prodMerch_gruCrossEntropy-_-prod Merch 10-1) (Retrieved from the internet Jan. 21, 2021) (2021).

Takahashi et al., "Metabolic engineering of sesquiterpene metabolism in yeast," Biotechnol Bioeng. 97(1)470-81 (2007).

International Search Report and Written Opinion for Int. App. No. PCT/EP2017/057133, dated Jun. 14, 2017.

International Search Report and Written Opinion for Int. App. No. PCT/EP2017/057137, dated Jun. 14, 2017.

International Search Report (ISR) for PCT/EP2017/072027 dated Dec. 12, 2017, pp. 1-5.

"Safety Assessment of Citrus Derived Peel Oils as Used in Cosmetics," Cosmetic Ingredient Review Expert Panel Final Report, Sep. 30, 2014: 1-31.

International Preliminary Report on Patentability for International Application No. PCT/EP2017/057124, dated Sep. 25, 2018.

Maia et al. "Plant-based insect repellents: a review of their efficacy, development and testing," Malaria Journal 10: Suppl1-11 (2011).

Hartley et al., "DNA cloning using in vitro site-specific recombination," Genome Res. Nov. 2000;10(11):1788-95.

Kejlova et al., "Phototoxicity of bergamot oil assessed by in vitro techniques in combination with human patch tests." Toxicol In Vitro., 21 :1298-1303 (2007).

Limonene CASRN: 138-86-3; Toxnet Toxicology Data Network, no date provided Mar. 23, 2021

International Search Report and Written Opinion for Int. App. No. PCT/EP2017/057124, dated Jun. 27, 2017.

* cited by examiner

SEQUENCE LISTING

<160> NUMBER OF SEQ ID NOS: 2

<210> SEQ ID NO 1
<211> LENGTH: 1647
<212> TYPE: DNA
<213> ORGANISM: Citrus sinensis

<400> SEQUENCE: 1

```
atgtcgtctg gagaaacatt tcgtcctact gcagatttcc atcctagttt atggagaaac      60
catttcctca aaggtgcttc tgatttcaag acagttgatc atactgcaac tcaagaacga     120
cacgaggcac tgaaagaaga ggtaaggaga atgataacag atgctgaaga taagcctgtt     180
cagaagttac gcttgattga tgaagtacaa cgcctggggg tggcttatca ctttgagaaa     240
gaaatagaag atgcaataca aaaattatgt ccaatctata ttgacagtaa tagagctgat     300
ctccacaccg tttcccttca ttttcgattg cttaggcagc aaggaatcaa gatttcatgt     360
gatgtgtttg agaagttcaa agatgatgag ggtagattca agtcatcgtt gataaacgat     420
gttcaaggga tgttaagttt gtacgaggca gcatacatgg cagttcgcgg agaacatata     480
ttagatgaag ccattgcttt cactaccact cacctgaagt cattggtagc tcaggatcat     540
gtaaccccta agcttgcgga acagataaat catgctttat accgtcctct tcgtaaaacc     600
ctaccaagat tagaggcgag gtattttatg tccatgatca attcaacaag tgatcattta     660
tacaataaaa ctctgctgaa ttttgcaaag ttagatttta acatattgct agagctgcac     720
aaggaggaac tcaatgaatt aacaaagtgg tggaaagatt tagacttcac tacaaaacta     780
ccttatgcaa gagacagatt agtggagtta tattttggg atttagggac atacttcgag     840
cctcaatatg catttgggag aaagataatg acccaattaa attacatatt atccatcata     900
gatgatactt atgatgcgta tggtacactt gaagaactca gcctctttac tgaagcagtt     960
caaagatgga atattgaggc cgtagatatg cttccagaat acatgaaatt gatttacagg    1020
acactcttag atgcttttaa tgaaattgag gaagatatgg ccaagcaagg aagatcacac    1080
tgcgtacgtt atgcaaaaga ggagaatcaa aaagtaattg gagcatactc tgttcaagcc    1140
```

```
aaatggttca gtgaaggtta cgttccaaca attgaggagt atatgcctat tgcactaaca    1200
agttgtgctt acacattcgt cataacaaat tccttccttg catgggtga ttttgcaact     1260 aaagaggttt ttgaatggat ctccaataac cctaaggttg taaaagcagc atcagttatc    1320
tgcagactca tggatgacat gcaaggtcat gagtttgagc agaagagagg acatgttgcg    1380
tcagctattg aatgttacac gaagcagcat ggtgtctcta aggaagaggc aattaaaatg    1440
tttgaagaag aagttgcaaa tgcatggaaa gatattaacg aggagttgat gatgaagcca    1500
accgtcgttg cccgaccact gctcgggacg attcttaatc ttgctcgtgc aattgatttt    1560
atttacaaag aggacgacgg ctatacgcat tcttacctaa ttaaagatca aattgcttct    1620
gtgctaggag accacgttcc attttga                                        1647
```

```
<210> SEQ ID NO 2
<211> LENGTH: 548
<212> TYPE: PRT
<213> ORGANISM: Citrus sinensis

<400> SEQUENCE: 2
```

```
Met Ser Ser Gly Glu Thr Phe Arg Pro Thr Ala Asp Phe His Pro Ser
1               5                   10                  15

Leu Trp Arg Asn His Phe Leu Lys Gly Ala Ser Asp Phe Lys Thr Val
            20                  25                  30

Asp His Thr Ala Thr Gln Glu Arg His Glu Ala Leu Lys Glu Val
        35                  40                  45

Arg Arg Met Ile Thr Asp Ala Glu Asp Lys Pro Val Gln Lys Leu Arg
50                  55                  60

Leu Ile Asp Glu Val Gln Arg Leu Gly Val Ala Tyr His Phe Glu Lys
65                  70                  75                  80

Glu Ile Glu Asp Ala Ile Gln Lys Leu Cys Pro Ile Tyr Ile Asp Ser
                85                  90                  95

Asn Arg Ala Asp Leu His Thr Val Ser Leu His Phe Arg Leu Leu Arg
            100                 105                 110

Gln Gln Gly Ile Lys Ile Ser Cys Asp Val Phe Glu Lys Phe Lys Asp
        115                 120                 125

Asp Glu Gly Arg Phe Lys Ser Ser Leu Ile Asn Asp Val Gln Gly Met
130                 135                 140

Leu Ser Leu Tyr Glu Ala Ala Tyr Met Ala Val Arg Gly Glu His Ile
145                 150                 155                 160

Leu Asp Glu Ala Ile Ala Phe Thr Thr Thr His Leu Lys Ser Leu Val
                165                 170                 175

Ala Gln Asp His Val Thr Pro Lys Leu Ala Glu Gln Ile Asn His Ala
            180                 185                 190

Leu Tyr Arg Pro Leu Arg Lys Thr Leu Pro Arg Leu Glu Ala Arg Tyr
        195                 200                 205

Phe Met Ser Met Ile Asn Ser Thr Ser Asp His Leu Tyr Asn Lys Thr
210                 215                 220

Leu Leu Asn Phe Ala Lys Leu Asp Phe Asn Ile Leu Leu Glu Leu His
225                 230                 235                 240

Lys Glu Glu Leu Asn Glu Leu Thr Lys Trp Trp Lys Asp Leu Asp Phe
                245                 250                 255

Thr Thr Lys Leu Pro Tyr Ala Arg Asp Arg Leu Val Glu Leu Tyr Phe
            260                 265                 270

Trp Asp Leu Gly Thr Tyr Phe Glu Pro Gln Tyr Ala Phe Gly Arg Lys
```

-continued

```
                        275                 280                 285
Ile Met Thr Gln Leu Asn Tyr Ile Leu Ser Ile Ile Asp Asp Thr Tyr
    290                 295                 300

Asp Ala Tyr Gly Thr Leu Glu Glu Leu Ser Leu Phe Thr Glu Ala Val
305                 310                 315                 320

Gln Arg Trp Asn Ile Glu Ala Val Asp Met Leu Pro Glu Tyr Met Lys
                325                 330                 335

Leu Ile Tyr Arg Thr Leu Leu Asp Ala Phe Asn Glu Ile Glu Glu Asp
                340                 345                 350

Met Ala Lys Gln Gly Arg Ser His Cys Val Arg Tyr Ala Lys Glu Glu
                355                 360                 365

Asn Gln Lys Val Ile Gly Ala Tyr Ser Val Gln Ala Lys Trp Phe Ser
    370                 375                 380

Glu Gly Tyr Val Pro Thr Ile Glu Glu Tyr Met Pro Ile Ala Leu Thr
385                 390                 395                 400

Ser Cys Ala Tyr Thr Phe Val Ile Thr Asn Ser Phe Leu Gly Met Gly
                405                 410                 415

Asp Phe Ala Thr Lys Glu Val Phe Glu Trp Ile Ser Asn Asn Pro Lys
                420                 425                 430

Val Val Lys Ala Ala Ser Val Ile Cys Arg Leu Met Asp Asp Met Gln
                435                 440                 445

Gly His Glu Phe Glu Gln Lys Arg Gly His Val Ala Ser Ala Ile Glu
    450                 455                 460

Cys Tyr Thr Lys Gln His Gly Val Ser Lys Glu Glu Ala Ile Lys Met
465                 470                 475                 480

Phe Glu Glu Glu Val Ala Asn Ala Trp Lys Asp Ile Asn Glu Glu Leu
                485                 490                 495

Met Met Lys Pro Thr Val Val Ala Arg Pro Leu Leu Gly Thr Ile Leu
                500                 505                 510

Asn Leu Ala Arg Ala Ile Asp Phe Ile Tyr Lys Glu Asp Asp Gly Tyr
                515                 520                 525

Thr His Ser Tyr Leu Ile Lys Asp Gln Ile Ala Ser Val Leu Gly Asp
    530                 535                 540

His Val Pro Phe
545
```

USE OF NOOTKATONE TO KILL SAP-SUCKING INSECTS

CROSS-REFERENCE TO RELATED APPLICATIONS

The present application is a U.S. National Phase Application pursuant to 35 U.S.C. § 371 of International Application No. PCT/EP2017/057138 filed Mar. 24, 2017, which claims priority to U.S. Provisional Patent Application No. 62/352,669, filed Jun. 21, 2016, and U.S. Provisional Patent Application No. 62/313,001, filed Mar. 24, 2016. The entirety of the disclosure of each of these applications is hereby incorporated by reference into the present application.

BACKGROUND OF THE INVENTION

Field of the Invention

This disclosure relates to the use of nootkatone-containing compositions to treat and prevent infestation of plants by sap-sucking insects, such as aphids and/or thrips.

Description of Related Art

One of the most serious inefficiencies in conventional agriculture is caused by damage, destruction, and/or economic devaluation of plants by insects. Of particular concern are sap-sucking insects. Sap-sucking insects puncture cell walls of buds, fruit, leaves, shoots and stems of plants and suck up plant cell contents either directly or indirectly following injection of enzymes to assist in extraction. Not only does this feeding process damage plants, but sap-sucking insects can transmit diseases to the plants during feeding.

Of the sap-sucking insects, perhaps the most commonly known is the aphid. In fact, about 4,400 species of aphids (*Aphidoidea*) are known. Aphids are distributed worldwide, but are most common in temperate zones where they are among the most destructive insects of cultivated plants. Around 250 species of aphids are serious pests for agriculture, forestry, greenhouse cultivation, and gardens.

Aphids are small, typically measure 1-10 mm in length, and frequently inhabit sheltered stems or the underside of leaves, making them hard to detect by the naked eye in the juvenile stages of growth. The average life cycle for an aphid is 20-40 days. Many aphid species undergo rapid asexual reproduction throughout summer and revert to sexual reproduction prior to laying eggs for overwintering. In warm climates and greenhouses, aphids may reproduce asexually in rapid numbers for many years without having to overwinter as eggs, and in such conditions, the threat of aphid infestation is constant.

The propensity for very rapid infestation of plants is well known to gardeners and all agricultural professionals, and may be exemplified by a single female cabbage aphid larva hatching in spring and producing up to 41 generations of females through the rest of that year. Thus, a single female may produce thousands of offspring.

Some aphid species feed on only a single plant species, whereas other species of aphid feed on hundreds of plant species. Aphids feed by puncturing the stems or leaves of host plants and predominantly feeding on the phloem and xylem. As they feed, aphids often transmit plant viruses to the host, resulting in plant damage or death. This has been extensively documented for example in potatoes, cereals, sugar beets, grape and various citrus plants. Very often the damage to a plant or fruit is observed before an aphid is seen.

In comparison to aphids, thrips are elongate, slender insects that are typically smaller than adult aphids, with most pest thrips species being up to 1 mm long but some species being up to 14 mm long. Approximately 6,000 species of thrips (*Thysanoptera*) have been described. Although thrips have fringed wings, they are not good flyers and are very similar to winged aphid species in relying on the wind or human or bird transportation to be carried long distances.

Very similar to the problems associated with aphids, thrips are pests of domestic plants and commercial crops. Thrips feeding on plants can damage fruit, leaves, and shoots and very noticeably affect plants' cosmetic appearance. Herbaceous ornamentals and vegetable crops are particularly susceptible to serious injury from thrips feeding and thrips-vectored viruses, especially when plants are young. Like aphids, feeding thrips puncture host plant structures such as buds, stems and leaves and suck up fluid contents, often leaving a distinctive silvery or bronze scarring on the surface that aids diagnosis of thrips infestation but also causes a reduction in the commercial or cosmetic value of the plant or plant part, such as a flower. Typical plant damage caused by feeding thrips may include stunted plant growth, stippling, flecking, white feeding scars, discoloration and silvering of leaves, papery leaves, premature leaf drop, and deformities such as galling. Additionally, many thrips species inject digestive enzymes and internal fluids during feeding, and these may include viruses, bacteria and/or fungi detrimental to the health, fertility and/or yield of the host plant. Therefore, thrips are also vectors for plant diseases. Indeed, the western flower thrips (*Frankliniella occidentalis*) now has a worldwide distribution and is the primary vector of plant diseases caused by tospoviruses. Over 20 plant-infecting viruses are known to be transmitted by thrips, including Tospoviruses such as the tomato spotted wilt virus and the impatiens necrotic spot virus. Some of these viruses can severely damage or kill certain vegetable crops and herbaceous ornamentals.

To compound the problem with many sap-sucking insects, by the time their damage is observed they may no longer be present. An example is "petal discoloring," which is pale or dark discoloring of petal tissue that was killed by feeding thrips before the buds opened. Sap-sucking insects such as aphids and thrips are therefore of significant commercial relevance in areas in which plant growth is controlled and managed, including but not limited to agriculture, forestry, flower cultivation, greenhouse cultivation, and professional grass management such as park and recreational areas. Even just the presence of excessive numbers of aphids and/or thrips feces, eggs, and/or larvae can reduce the marketability or cosmetic appeal of a plant or harvested portion of the plant.

Populations of sap-sucking insects can grow rapidly under the right conditions (typically warm and humid but species-specific), and several thrips species are known to form large swarms and become an irritation to humans. Such conditions may occur during warm seasons of the year and lead to massive swarms, but these conditions are highly likely to occur in artificial microclimates maintained in such structures as indoor grow rooms, polytunnels, greenhouses, conservatories, etc.

Aphids can be easily killed by reduced temperatures such as late spring freezes. However, transparent or semi-transparent "forcing sheets" (a form of agrotextiles) often laid over agricultural crops to encourage early germination and protect shoots from freezing temperatures can simultaneously provide safe harbor for aphids and thrips. Similarly, other artificial microclimates, such as a house, a greenhouse, a polytunnel, or other warm sheltered environment that have similar plant growth benefits also have acknowledged detrimental effects in terms of aphid and/or thrips infestations.

Efforts to combat sap-sucking insect infestations include use of biological pest controls and pesticides. Biological pest control (using insect or other sap-sucking insect predators) is of limited effect since sap-sucking insects frequently reproduce and expand in population very rapidly and are small and difficult to predate. However, many sap-sucking insects have also been shown to develop rapid resistance to some commonly used pesticides. For example, thrips develop resistance to pesticides easily and their small sizes and high rates of reproduction make them difficult targets for biological control since any introduced or encouraged predator must be slender enough to penetrate the crevices and burrows where thrips feed and lay eggs. Moreover, available pesticides can be problematic themselves. For example, oxamyl, a carbamate pesticide that is efficient in controlling a large number of sap-sucking insects, such as aphids and thrips, is extremely toxic to humans and overuse can lead to accumulation in food. Indeed, the granulated form has been banned by the U.S. Environmental Protection Agency. Similarly, dinotefuran, a neonicotinoid class insecticide developed to have broad insecticidal activity, is not suitable for frequent or repeated use and has been inconclusively correlated with large bee kills.

Therefore, in light of the current challenges to controlling sap-sucking insects, there is a growing need for effective, environmentally friendly compositions and methodologies to prevent and treat sap-sucking insect infestations.

SUMMARY OF THE INVENTION

Provided herein are effective natural compositions and methods of their use to treat and prevent sap-sucking insect infestations.

In a first aspect, the invention provides a method of treating or preventing sap-sucking infestation of a plant, the method including applying a nootkatone-containing composition to a surface, wherein the surface is a surface of the plant, soil, a planting bed, hydroponics equipment, harvesting equipment, an agricultural tool, a storage container, or a shipping container.

In one embodiment of the first aspect, the nootkatone-containing composition is applied to the surface by an aerosol container with a spray nozzle, a spray gun, an impregnated sheet, a film, a matrix, a pump sprayer, a trigger sprayer, a pressurized spraying device, a sponge, a brush, or a roller, a tractor, an irrigation spray, a helicopter, or a crop duster or airplane.

In a second aspect, the invention provides a method of treating or preventing a sap-sucking insect infestation of a plant, the method including (a) providing a nootkatone-containing composition, (b) optionally reducing the concentration of the nootkatone-containing composition to a working concentration with a carrier, and (c) applying the composition to a surface or area to be treated.

In one embodiment of the second aspect, the surface is either a surface of a plant to be treated or a surface of a dispenser. In another embodiment of the second aspect, the method further includes applying the dispenser to a surface to be treated, to a plant surface or to an area susceptible to infestation by sap-sucking insects.

In a further embodiment of the second aspect, the plant surface, the surface to be treated, or the area susceptible to infestation by sap-sucking insects is within an agricultural area, an agricultural field, an arable field, a greenhouse, an area for mushroom cultivation, an indoor area of commercial flower cultivation, a commercial forest, a grassy area subjected to professional grass management, or a private lawn. In another embodiment of the second aspect, the carrier is a natural fertilizer, a chemical fertilizer, mulch, compost, water, agrotextile, top soil, potting soil, vermiculite or other soil amendment, or an agricultural waste product.

In a third aspect, the invention provides a method of treating or preventing a sap-sucking insect infestation, the method including applying a nootkatone-containing composition to surface to be treated by a dispenser. The dispenser is adapted to concomitantly apply the composition to the surface and physically remove at least one sap-sucking insect from the surface. In one embodiment of the third aspect, the dispenser is a tissue, a wet wipe, a wet pad a suction device, or a water dispenser.

In a fourth aspect, the invention provides a method for increasing or preserving the commercial value of a plant or plant part, or the average commercial value of plants or plant parts in an area susceptible to infestation by sap-sucking insects, the method including (a) applying a nootkatone-containing composition to a surface, plant surface, or agricultural area, (b) treating or preventing a sap-sucking insect infestation of the plant or agricultural area, and (c) improving or preserving plant health, yield, and/or aesthetic appearance.

In one embodiment of the fourth aspect, treating or preventing a sap-sucking insect infestation preserves or increases the average commercial value of plants or plant parts by reducing the occurrence of disease transmission between plants or plant surfaces caused by sap-sucking insect infestation.

In a fifth aspect, the invention provides a composition for treating or preventing a sap-sucking insect infestation including (a) about 0.1% to about 10% nootkatone; and (b) about 90% to about 99.9% carrier. In one embodiment of the fifth aspect, the composition includes (a) about 2% nootkatone and (b) about 98% carrier. In another embodiment of the fifth aspect, the carrier is a natural fertilizer, a chemical fertilizer, mulch, water, agrotextile, compost, top soil, potting soil, vermiculite or other soil amendments, an agricultural waste product, or a mixture thereof. In a further embodiment of the fifth aspect, the composition is a about 5×, about 10×, about 20×, about 30×, or about 60× concentrate.

In one embodiment of any of the preceding aspects or embodiments, the sap-sucking insect is an aphid, a thrips, a scale insect, a psyllid, a whitefly, a leafhopper, a stink bug, a tarnished plant bug, a squash bug, and a spider mite.

In another embodiment of any of the preceding aspects or embodiments, the composition comprises nootkatone ex valencene.

In a further embodiment of any of the preceding aspects or embodiments, the nootkatone is limonene-free.

In a further embodiment of any of the preceding aspects or embodiments, the nootkatone is bergapten-free.

These and other features and advantages of the present invention will be more fully understood from the following detailed description of the invention taken together with the accompanying claims. It is noted that the scope of the claims is defined by the recitations therein and not by the specific discussion of features and advantages set forth in the present description.

DESCRIPTION OF DRAWINGS

The following detailed description of the embodiments of the present invention can be best understood when read in conjunction with the following drawings.

DETAILED DESCRIPTION

Figure 1:
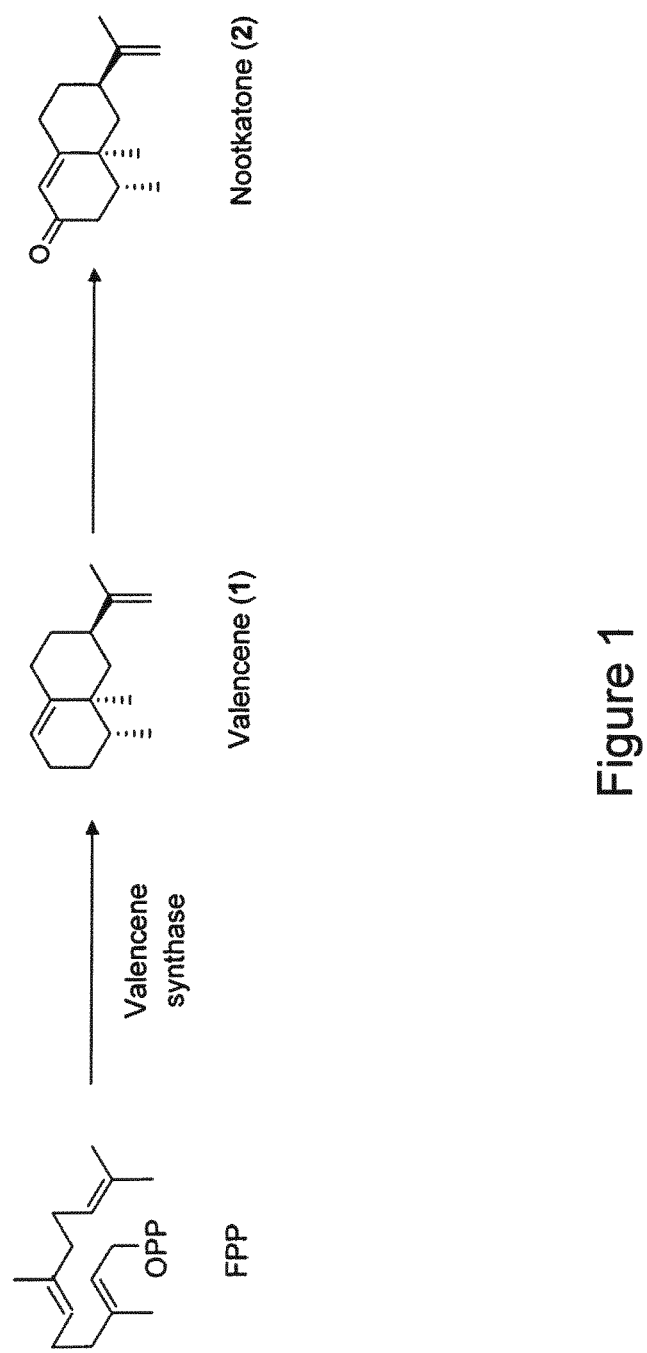
FIG. 1 illustrates a biosynthetic pathway for nootkatone.

All publications, patents and patent applications cited herein are hereby expressly incorporated by reference in their entirety for all purposes.

Before describing the present invention in detail, a number of terms will be defined. As used herein, the singular forms "a," "an," and "the" include plural referents unless the context clearly dictates otherwise. For example, reference to "an active ingredient" means one or more active ingredients.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

As used herein, the term "about" refers to ±10% of any particular value.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z."

As used herein, the term "active ingredient" refers to a chemical compound or mixture of chemical compounds that kills and/or repels sap-sucking insects from any part of a plant, or any surface of a facility used to grow plants, such as a grow room, greenhouse, polytunnel, agro-materials used to protect plants from low temperatures, or other surfaces, materials, and substances disclosed herein.

As used herein, the term "sap-sucking insects" refers to any sucking and/or chewing insects that infest or feed upon plants, fruit, or portions thereof. Sap-sucking insects include but are not limited to aphids and/or thrips. For example, additional sap sucking insects include scale insects, which are in the same order and suborder as aphids. Further examples include psyllids (also known as, jumping plant lice), whiteflies (which fall into Sternorryncha, in the Family Aleyroididae), leafhoppers, stink bugs, tarnished plant bugs, squash bugs, and spider mites.

As used herein, the term "aphid" refers to a single aphid and/or two or more aphids of the same or different species. As used herein, the term "aphids" refers to any aphid species, including but not limited to melon aphids, soybean aphids, black bean aphids, Pea aphids (*Acyrthosiphon pisum*) rose aphid (*Macrosiphum rosae*, or less commonly *Aphis rosae*), apple aphid (*Aphis pomi*), and green peach aphids.

As used herein, the term "thrips" refers to a single thrips and/or two or more thrips of the same or different species. As used herein, the term "thrips" refers to any thrips species, including but not limited to *Thrips palmi, Thrips tabaci*; Cuban laurel thrips (*Gynaikothrips ficorum*), *Myoporum* thrips, Western flower thrips, Citrus thrips, avocado thrips, *Frankliniella schultzei*, common blossom thrips (*Thripidae*), greenhouse thrips (*Heliothrips haemorrhoidalis*), chilli thrips (*Scirtothrips dorsalis*), redbanded thrips (*Selenothrips rubrocinctus*), melon thrips (*Thrips palmi*), and gladiolus thrips (*Thrips simplex*).

As used herein, the term "treatment of sap-sucking insects" is used interchangeably with "treatment of aphids and/or thrips" and refers to a process by which sap-sucking insects are at least one of killed, removed, or repelled from an object, a surface, plant or portion of a plant. In this context, treatment of sap-sucking insects may include any manner of treatment performed to reduce the population of sap-sucking insects. Examples of treatments include applying a composition including nootkatone, freezing, heating to 30° C. or higher, treatment with red light, treatment with a soap spray, applying a composition including a carbamate or neonicotinoid pesticide (such as oxamyl or dinotefuran) and/or one or more biopesticides or biopesticide active ingredients, such as those registered with the United States Environmental Protective Agency, and combinations thereof. Treatment of sap-sucking insects may include a second or subsequent treatment to prevent recovery of the sap-sucking insect population.

As used herein, the terms "surface" or "object to be treated" interchangeably refer to any plant, portion of a plant, surface area and/or material that sap-sucking insects may attempt to traverse or inhabit, or are surfaces and objects on which sap-sucking insects may be observed or could act as vectors for the transportation of sap-sucking insects, or are areas commonly frequented by humans who may consider swarms of sap-sucking insects to be bothersome. Examples of surfaces include, without limitation, tables, benches, desks, pathways, gutters, irrigation channels, drainage channels, carpets, floor boards, head boards, curtains, window sills, mantelpieces, work surfaces in home or office, doors, wall moldings, walls, sheets of glass, or any surface of a vehicle, equipment, or tool used to handle or transport plant or agricultural material.

As used herein, the terms "an environment rich in sap-sucking insects," "agricultural area susceptible to infestation by sap-sucking insects," and "locations with high concentrations of plant or plant parts susceptible to damage by sap-sucking insects" are used interchangeably and refer to one or more environments preferred by sap-sucking insects for at least one of feeding, breeding, or egg laying and that are capable of harboring high concentrations of sap-sucking insects. These areas may be outdoors or at least partially enclosed as an indoor or sheltered environment capable of sustaining a different microclimate to the external environment. Examples of such areas and environments include but are not limited to an agricultural field, an arable field, a greenhouse, an area for mushroom cultivation, an indoor area of commercial flower cultivation, a commercial forest, a hydroponics facility, grassy areas subjected to professional grass management such as in parks and recreational areas, and private gardens and lawns.

As used herein, the terms "plant," "plant part," "portion of a plant," "plant portion," and "crop" are used interchangeably and refer, for example, to whole plants, plant extracts, leaves, roots, grain, fruits, seeds, nuts, and flowers or other plant parts of cosmetic, aesthetic, or commercial value. Examples of contemplated crops include but are not limited to mushrooms, potatoes, avocados, citrus fruit, apples, nectarines, raspberries, blueberries, grapes, roses, legumes, tobacco, mustard family plants, peppers, spinach, tomatoes, carrots, lettuce, corn, pears, and plums.

As used herein, the term "effective concentration" is interchangeably used with "working concentration" and refers to a concentration of an active ingredient (such as nootkatone) within a composition such that when the composition is applied to a sap-sucking insect or to a relevant surface, a sap-sucking insect that is contacted by the composition is repelled and/or experiences paralysis, poisoning, neuro-muscular damage, or death.

As used herein, the term "nootkatone" refers to a compound seen in FIG. 1 that may be synthesized, isolated, and purified from of a mixture of products produced in a host modified to express enzymes of the nootkatone biosynthetic pathway or that can be produced from naturally occurring sources, such as citrus plants. "Nootkatone" also refers to a mixture of chemical compounds containing or enriched for the nootkatone compound and derived from a modified host, such as a microorganism, or isolated or derived from plant extracts. "Nootkatone" further refers to derivatives and analogs thereof. For example, the nootkatone compound contemplated for use herein may be produced in vivo through expression of one or more enzymes involved in the nootkatone biosynthetic pathway in a recombinant yeast or in vitro using isolated, purified enzymes involved in the nootkatone biosynthetic pathway, such as those described in U.S. Patent Application Publication Nos. 2015/0007368 and 2012/0246767. Therefore, nootkatone as defined herein can differ chemically from other sources of nootkatone, such as extracts from plants and derivatives thereof, or may include such plant extracts and derivatives thereof.

As used herein, the term "nootkatone ex valencene" refers to nootkatone derived from oxidation of valencene that was produced by fermentation, such as by microorganisms harboring one or more valencene synthases and/or other molecules that catalyze formation of valencene. Further, nootkatone ex valencene refers to a combination of chemical compounds derived from oxidation of a valencene-containing fermentation product produced by culturing microorganisms harboring one or more valencene synthases and/or other molecules that catalyze formation of valencene. Nootkatone ex valencene can be purified to maximize the percent of nootkatone relative to other chemical compounds. For example, nootkatone ex valencene can be less than about 50%, about 50%, about 60%, about 70%, about 80%, about 90%, or about 98% nootkatone.

Overview

Disclosed herein are nootkatone-containing compositions and methods of using the compositions that are effective at treating and preventing infestations of sap-sucking insects such as aphids and/or thrips.

Some aspects of the current disclosure aim to kill sap-sucking insects, including aphids and/or thrips, or to reduce the frequency or prevalence of sap-sucking insect infestation of plants, trees, flowers, fruit, or other agricultural produce. In further aspects of the invention, fields, flower beds, greenhouses, or other locations frequently infested by sap-sucking insects can be treated with nootkatone-containing compositions so as to reduce the frequency of infestations or severity of damage to plants susceptible to infestation.

In another aspect, the current disclosure provides methods and uses for a composition comprising nootkatone suitable for treating a surface, a plant or plant part, an environment rich in sap-sucking insects, or locations with high concentrations of plant or plant parts susceptible to damage by sap-sucking insects such as aphids or thrips, for delaying the onset of or reducing the frequency of sap-sucking insect, aphid or thrip-associated damage to crops, fruit or agricultural produce.

Similarly, some aspects of the current disclosure are intended to increase the commercial value of a plant or plant part by applying a nootkatone-containing composition to the plant or plant part to at least one of either prevent infestation of the plant or plant part with a sap-sucking insect or treat such an infestation resulting in maintained, preserved, and/or improved plant health and/or aesthetic appearance of the plant.

Additional aspects of the current disclosure are intended to reduce or prevent the occurrence of disease transmission by sap-sucking insect infestation in a population of plants treated with a nootkatone-containing composition.

In one embodiment, the use of nootkatone provides a sustainable and biodegradable alternative to current sap-sucking pesticides.

In some embodiments, compositions containing nootkatone may be administered alone to effectively treat a sap-sucking insect infestation of a plant. In other embodiments, nootkatone-containing compositions are used in combination with other insecticides or other treatments disclosed herein to effectively treat a sap-sucking insect infestation of a plant. For example, compositions including nootkatone may be administered in combination with or successively with the application of natural predators of sap-sucking insects to a plant in need thereof. For example, natural predators of *Aphidoidea* include predatory ladybirds, hoverfly larvae, parasitic wasps, aphid midge larvae, crab spiders, lacewings, and entomopathogenic fungi such as *Lecanicillium lecanii* and the *Entomophthorales*. Natural predators of thrips include, for example, *Beauveria bassiana* and *Verticillium lecanii*. Some pesticides of the art used against *Aphidoidea* and/or thrips are also effective in killing their natural predators, thus reducing the long term biological control available in the area in which pesticide has been applied. As shown in the examples below, at lower concentrations, nootkatone does not have such a broad specificity on common insects.

In some embodiments, compositions comprising nootkatone and soap may be administered in a sprayable composition.

In some embodiments, compositions comprising nootkatone may be administered within water applied to plants, such as in water used for irrigation or utilized in a predominantly aqueous growth media for the plant, such as in hydroponic growth.

In some embodiments, compositions comprising nootkatone may be administered as a preventative treatment to prevent "color break" or other damage to plants or plant parts with delayed presentation following infestation or feeding by sap sucking insects such as aphids or thrips.

In some embodiments, compositions comprising nootkatone may be administered to an area or surface upwind of an area of human habitation or an area rich in plants susceptible to infestation by sap sucking insects. "Upwind" may be determined by a short term weather forecast or it may be known to be the direction of the dominant wind or warm seasonal airflow in a location in which an infestation of sap-sucking insects such as aphids and/or thrips is to be prevented.

In some embodiments, compositions comprising nootkatone may be administered to a surface on or within a vehicle including but not limited to an agricultural vehicle, forestry vehicle, or vehicle for transporting plants, plant produce, or agricultural or forestry equipment.

Surfaces to be treated for sap-sucking insects can be any part of a plant or agricultural area, vehicles, or any surface in proximity or adjacent to an agricultural area susceptible to infestation by sap-sucking insects, locations with high concentrations of plant or plant parts susceptible to damage by sap-sucking insects, or human habitations. Such surfaces may comprise plant stems, shoots, buds, leaves, flowers, fruit, wood, metal, plastic, cotton, wool, silk, satin, or any fabric suitable for use in agriculture, forestry, transport or furniture.

In some embodiments, nootkatone compositions may be combined with existing technologies to treat and/or prevent sap-sucking infestations. For example, an agricultural fabric may be contacted, impregnated or coated with a composition including nootkatone. An example of such a fabric is an agrotextile. The term "agrotextile" refers to a fabric typically having a knitted, woven, or nonwoven structure suitable for use in agriculture, horticulture, floristry, forestry, animal or bird husbandry, commercial or domestic use in gardens, greenhouses, and the like. The fibers used to manufacture agrotextiles include polypropylene, polyethylene, biodegradable plastic, or any inexpensive plant fibre such as jute or coir.

Agrotextiles are used as a ground cover and typically applied after sowing or planting a crop or ornamental plant. Agrotextiles can be air, water, and/or light permeable and are effective at elevating ground temperature and retaining water content. Thus farmers, greenhouse owners and domestic users deploy agrotextiles to create a microclimate highly favourable for accelerated plant growth and for earlier planting or sowing with reduced risk of frost. However, agrotextiles make the conventional use of pesticides problematic and the created microclimate conditions may also encourage the growth of pests. Hence, it is an objective of some embodiments of the current invention to provide an agrotextile coated with or including nootkatone and capable of repelling or killing sap-sucking insects. Examples of agrotextiles coated with or including nootkatone may be at least a portion of a mulch mat, ground cover, weed control mat, forcing cover, polytunnel, plant cover, fruit cover, insect screen, shade screen, blanching screen, ventilation screen, agro bag, crop net, fruit net, animal net, bird net, or an anti-hail net. The provision of shade by a suspended agrotextile is beneficial for some plants, but also for air drying of fruits (such as grapes) and flowers (such as hops, roses and orchids). Agro bags and fruit nets coated with or impregnated with a composition including nootkatone can also reduce the damage sap-sucking insects can cause to harvested crops or harvested portions of plants. In this way, an agrotextile contacted with or impregnated with a composition comprising nootkatone is suitable for use in agriculture, horticulture, forestry, animal or bird husbandry, or domestic use in gardens, greenhouses and the like. Further combinations of nootkatone-containing combinations and agricultural devices and methods are contemplated as described herein elsewhere.

Compositions

Nootkatone-containing compositions contemplated herein can be formulated for direct application to a surface or a sap-sucking insect rich environment to reduce the population or as a prophylactic to prevent the growth of the population or spread of the population to other locations by feeding the subject the nootkatone-containing composition. In addition, nootkatone-containing compositions contemplated herein can be formulated for application as a dip, such as by dispensing into or onto a zone or area of water in which the articles to be treated may be immersed. A further manner of application includes coating/impregnating surfaces and/or articles with nootkatone-containing compositions.

Generally and without limitation, compositions contemplated herein can be in the form of an aqueous liquid, an oil-based liquid, a concentrated liquid, a gel, a foam, an emulsion, a slurry, a paint, a clear coat, a wax, a block, a pellet, a puck, a granule, a powder, a capsule, a vesicle, an effervescent tablet, slow release tablet, an impregnated dissolvable sheet or film, an impregnated material, and combinations thereof.

In certain aspects, a composition may be formulated as a liquid or aerosol formulation suitable for application in a spray, a roll on, a dip, detergents, carpet cleaner, durable water repellence formulations.

In certain aspects, a composition may be formulated for application by dispensing into or onto an area of water suitable for use as an immersion dip or volume of washing water into which articles to be treated and/or plants may be at least partially submerged. In this context, the composition can be provided as an aerosol, a solution, an emulsion, an oil, a spray, a gel, a powder, a foam, a block, a pellet, a puck, a granule, a vesicle, a powder, a capsule, and combinations thereof.

In certain aspects, a composition may be formulated comprising a portion of material such as a tissue, pad, cloth, sponge or sheet impregnated, immersed or coated with a liquid composition comprising nootkatone at a concentration of between 0.01-10% by volume of the liquid composition. The material can be impregnated, immersed, and/or coated with a liquid composition including nootkatone at a concentration of between 0.01-10% by volume of the liquid composition. In certain aspects, the portion of material is a disposable thin sheet of material such as a tissue, a wet wipe, or a wet pad, similar to those sold under the Swifter®, Pledge®, Windex®, Clorox® brands.

In other embodiments of the invention, compositions contemplated herein can contain a carrier and at least about 0.1%, or at least about 1%, or at least about 2%, or at least about 5%, or at least about 7.5%, or at least about 10%, or greater than about 10%, or greater than about 15%, or greater than about 20%, or greater than about 25%, or greater than about 50% by weight nootkatone. In some applications, nootkatone can be present in an amount that is greater than about 60%, about 70%, about 80%, about 90%, about 95% or about 99% by weight of the composition. In one example, the provided compositions contain nootkatone in an amount at or about 0.001% to at or about 2%, or about 0.01% to at or about 5%, or about 0.01% to at or about 75% by weight of the composition. In another example, a composition may contain nootkatone in an amount of from at or about 1% to at or about 50% by weight of the composition.

In another example, a composition may contain nootkatone in an amount of from at or about 5% to at or about 40% by weight of the composition. In another example, a composition may contain nootkatone in an amount of from at or about 10% to at or about 30% by weight of the composition. In another example, a composition may contain nootkatone in an amount of from at or about 15% to at or about 25% by weight of the composition. In another example, a composition may contain nootkatone in an amount of from at or about 1% to at or about 90% by weight of the composition. In another example, a composition may contain nootkatone in an amount of about 10%, or about 15%, or about 20%, or about 25%, or about 30%, or about 50% by weight of the composition. In another example, a composition may contain nootkatone in an amount of up to about 99% or more by weight of the composition.

In one particular embodiment, a contemplated nootkatone-containing composition is provided as a "concentrate". For example, a nootkatone-containing composition may be provided as a 20×, or a 10×, or a 5×, or a 3× concentrate that can be diluted by an end user with an appropriate solvent to achieve a 1× working concentration. Alternatively, a nootkatone-containing composition may be provided to an end user at a 1× working concentration. However, any concentration is contemplated for use herein. For example, compositions provided as concentrates can be used without dilution at all or may be diluted from a highly concentrated concentrate (e.g., about 20× to about 100×, or about 30× to about 60×, or about 30×, or about 60×) to some multiple of concentration higher than 1×, such as 2×, 2.5×, 3×, etc. or can be used at a more dilute concentration, such as ½×, ¼×, ¹⁄₁₀×, etc.

In another embodiment, a contemplated composition may be seen in Table No. 1, where ingredients can be measured in percent volume per volume, percent weight per volume, or percent by weight.

TABLE NO. 1

Contemplated composition formulation.

| Ingredient | Approximate % |
|---|---|
| Nootkatone | 0.01-100 |
| Additional active ingredients | 0-99.9 |
| Carrier | 0-99.9 |
| Additives | 0-99.9 |

In certain embodiments, compositions contemplated herein may include nootkatone and one or more additional active ingredients. The one or more additional active ingredients may be effective against sap-sucking insects, such as a pesticide against aphids or thrips. In some aspects, the additional active ingredients against sap-sucking insects have highly selective toxicity for a specific sap-sucking insect, such as aphids or thrips. In another embodiment, an additional active ingredient can be lipid-soluble so that it can be released over an extended period of time, such as, for example, approximately 2 months.

Additional active ingredients can include one or more biopesticides or biopesticide active ingredients, such as one or more of those registered with the United States Environmental Protective Agency. Additional active ingredients can also include pheromones, such as the California red scale pheromone that is effective against scale insects. Further examples include pyrethroids, neem oil, or natural plant extracts.

Further examples of additional active ingredients include plant essential oil compounds or derivatives thereof. Examples include aldehyde C16 (pure), α-terpineol, amyl cinnamic aldehyde, amyl salicylate, anisic aldehyde, benzyl alcohol, benzyl acetate, cinnamaldehyde, cinnamic alcohol, carvacrol, carveol, citral, citronellal, citronellol, p-cymene, diethyl phthalate, dimethyl salicylate, dipropylene glycol, eucalyptol (cineole) eugenol, is-eugenol, galaxolide, geraniol, guaiacol, ionone, menthol, methyl salicylate, methyl anthranilate, methyl ionone, methyl salicylate, α-phelian-drene, pennyroyal oil perillaldehyde, 1- or 2-phenyl ethyl alcohol, 1- or 2-phenyl ethyl propionate, piperonal, piperonyl acetate, piperonyl alcohol, D-pulegone, terpinen-4-ol, terpinyl acetate, 4-tert butylcyclohexyl acetate, thyme oil, thymol, lavendar oil, rosemary oil, peppermint oil, neem oil, clove extract, metabolites of trans-anethole, vanillin, and ethyl vanillin.

In another embodiment, a contemplated composition may include a nootkatone to additional active ingredient ratio of about 1:10, or about 1:8, or about 1:6, or about 1:4, or about 1:2, or about 1:1, or about 2:1, or about 4:1, or about 6:1, or about 8:1, or about 10:1.

In a further example, nootkatone containing compositions included herein that are effective against sap-sucking insects can also include an additional active ingredient effective for repelling or killing other non-sap-sucking insects or pests or for killing nuisance plants.

In other embodiments, compositions contemplated herein can include nootkatone in combination with one or more additives, such as a fragrance, a preservative, a propellant, a pH buffering agent, a UV blocker, a pigment, a dye, a surfactant, an emulsifier, a solvent, a salt, an acid, a base, an emollient, a sugar, and combinations thereof. Additional additives include disinfectants, sap-sucking insect attractants or chemical lures and detergents. Contemplated disinfectants include quaternary ammonium compounds, phenol-based antimicrobial agents, and botanical oils with disinfectant properties. In one embodiment, a nootkatone-containing composition contemplated includes an organic material that a sap-sucking insect would consume.

In other embodiments, nootkatone-containing compositions can include a carrier, such as an aqueous liquid carrier, water, a saline, a gel, an inert powder, a zeolite, a cellulosic material, a microcapsule, an alcohol such as ethanol, a hydrocarbon, a polymer, a wax, a fat, an oil, and the like. Other examples of carriers include agrotextiles. Some carriers include time release materials where a nootkatone-containing composition may be released over a period of hours, or days, or weeks. Additional carriers include agricultural substances, such as, a natural fertilizer, a chemical fertilizer, mulch, compost, top soil, potting soil, vermiculite or other soil amendments, or agricultural waste products, and mixtures thereof.

Carriers may be added to a composition in an amount of about 10%, or about 15%, or about 20%, or about 25%, or about 30%, or about 50% by weight of the composition. In some applications, a carrier can be present in an amount that is at or greater than about 60%, about 70%, about 80%, about 90%, about 95%, or about 99% by weight of the composition.

Additional specific formulations are shown in Table No. 2.

TABLE No. 2

Nootkatone Surface Spray Formulations.

| Ingredients | Formulations (values shown are % weight) | | | | | |
| --- | --- | --- | --- | --- | --- | --- |
| | 1 | 2 | 3 | 4 | 5 | 6 |
| Nootkatone | 1.0 | 1.0 | 0.5 | 0.2 | 5.0 | 10.0 |
| Butylated hydroxytoluene | 0.1 | 0.1 | 0.1 | 0.1 | — | — |
| Isopropyl myristate | 5.0 | 5.0 | 5.0 | 5.0 | — | — |
| Vanillin (or other fragrance) | 1.0 | — | — | — | — | — |
| Peppermint oil (or other plant essential oil) | 1.0 | — | — | — | — | — |
| Isopropyl alcohol | 91.9 | 93.9 | 94.4 | 94.7 | — | — |
| Agricultural substance | — | — | — | — | 95.0 | 90.0 |

Methods

According to some aspects of the current invention, nootkatone-containing compositions can be directly applied to sap-sucking insects and surfaces of plants. According to other aspects of the current invention, nootkatone-containing compositions may be applied to soil and other plant culture substrates, planting beds, hydroponics equipment, and other agricultural infrastructure. Additional areas to be treated include locations with high concentrations of plant or plant parts susceptible to damage by sap-sucking insects, such as harvest equipment, agricultural tools including shovels, hoes, rakes, sheers, saws, baskets, gloves, wagons, etc., and storage and shipping containers.

Treatment for sap-sucking insect infestation may be routine or prophylactic based on changing environmental conditions (such as raised humidity or temperature), seasonal changes (such as transitions from spring to summer to fall to winter), or in response to crops, plants or plant parts displaying symptoms or damage consistent with infestation of sap-sucking insects or combinations thereof. For example, contemplated methods of treating or preventing sap-sucking insect infestation of plants include application of nootkatone-containing compositions and/or dispensers/applicators to environments rich in sap-sucking insects, agricultural areas susceptible to infestation by sap-sucking insects, and locations with high concentrations of plant or plant parts susceptible to damage by sap-sucking insects.

According to some aspects of the current invention, nootkatone-containing compositions may be applied once per day, once per week, twice per week, once per two weeks, once per month, once per two months, or once per three months.

In some embodiments, contemplated methods include treating agricultural or forestry areas, greenhouses or other artificial microclimates such as within human dwellings or under sheets of agrotextiles. In some embodiments, treatment with a composition including nootkatone may be performed at a temperature between 0 and 25° C., preferably between 5° C. and 20° C. Later in the growing season of many plants, rising temperatures, such as temperatures higher than 30° C., can lead to heat that kills the symbiotic bacteria present in the guts of aphids and thrips (including bacteria that for example provide essential amino acids), resulting in aphid infertility and/or death. In some embodiments, treatment with a composition comprising nootkatone may be performed prior to the growing season, or in the first two months of the growing season, or once the minimum overnight temperature exceeds at least 7° C., preferably at least 10° C.

Various methods according to some aspects of the current invention may be employed to contact sap-sucking insects, surfaces, environments rich in sap-sucking insects, agricultural areas susceptible to infestation by sap-sucking insects, locations with high concentrations of plant or plant parts susceptible to damage by aphid or thrips infestations, plants or portions of plants with nootkatone-containing compositions. Such methods may include addition of nootkatone-containing compositions to water in which the sap-sucking insect, surface or area to be treated may be rubbed, wiped, brushed, or sprayed.

Nootkatone can be applied, such as by directly pouring the composition into the water or placing a composition dispenser within a sink, rain collection receptacle, tank, irrigation channel, hand pump spray or any other appropriately sized receptacle such that the surface, plant, portion of a plant, object or environment to be treated comes into contact with the nootkatone at an effective concentration of, for example, between 100 and 2,000 ppm, preferably between 200 and 400 ppm, most preferably approximately 300 ppm. The plant, portion of a plant, surface, object or environment to be treated may be exposed to any of the contemplated nootkatone-including compositions for about 15 minutes to about 24 hours before rinsing or treatment with uv light, or the applied nootkatone-containing composition may be left without active removal to degrade naturally. In a preferred embodiment of one aspect of the current invention, the plant, portion of a plant, surface, object or environment to be treated is exposed to an effective amount of nootkatone, such as, at concentration of 300 ppm, for at least 15 minutes.

In contrast to many active agents against sap-sucking insects in the art, nootkatone is able in some compositions of the current invention to form a film on the surface of water, Therefore, some methods according to the current invention employ procedures of immersing an object to be treated into nootkatone-containing receptacles such that the object to be treated must pass through the surface of the water such that a film of nootkatone at least partially envelopes and/or coats the treated object. For example, a tool, appliance, storage bag, article of clothing, receptacle suitable for transporting a plant or harvested portions thereof, or an agrotextile, suitable for use in any of agricultural, forestry, gardening, park management or recreational area management may be dipped into a composition containing nootkatone. In one example, seedlings can be dunked into a contemplated formulation.

In a further embodiment, methods of application to a subject of an effective concentration of nootkatone by liquid, spray, powder, or wash is preferably performed in a commercial or domestic area for growing plants such as an agricultural field, forest, flowerbed, a polytunnel, greenhouse, conservatory, office, home, and/or dwelling. According to another embodiment, the application to a subject of an effective concentration of nootkatone by liquid, spray, powder, or as a surface treatment, or wash is preferably performed in an area frequented by humans such as a communal building, workplace, home, dwelling, hotel, ferry, train, plane, bus, car, caravan, campervan, mobile home, or tent.

Dispensers/Applicators

In some embodiments, dispensers or applicators for dispensing or applying a composition contemplated herein are intended to be reused. For example, upon dispensing a nootkatone-containing composition, the dispenser or applicator can be refilled. In other embodiments, a dispenser or applicator is a single-use device or substance that functions as a nootkatone composition carrier that is itself dispensed or degraded. For example, a dispenser or applicator (i.e., carrier) can be an agricultural substance for distribution in, on, and/or around agricultural areas, such as a natural fertilizer, a chemical fertilizer, mulch, compost, top soil, potting soil, vermiculite or other soil amendments, or agricultural waste products. Such agricultural substances may themselves be dispensed or applied by spreaders and other means as known in the art.

Topical compositions disclosed herein may be dispensed using a dispenser or applicator including one or more of a spray bottle, a brush, a dropper, a sponge, a soft-tipped marking device with reservoir, pressurized dispenser, an aerosol can, a roll on bottle, a wipe, a tissue, a duster, and other devices suitable for application to surfaces, objects or sap-sucking insect rich environments. For example, sap-sucking insects, surfaces, objects, environments rich in sap-sucking insects, agricultural areas susceptible to infestation by sap-sucking insects, locations with high concentrations of plant or plant parts susceptible to damage by sap-sucking insect infestations, plants or portions of plants may be sprayed, brushed, wiped, dipped, and/or soaked with a nootkatone-containing composition.

In one embodiment, compositions contemplated herein may be applied to one or more surfaces using an applicator having a reservoir for carrying a composition in a wet form and/or a dry form. Examples of applicators that may be used include an aerosol container with a spray nozzle with or without a spray straw to focus delivery of the composition, a spray gun, an impregnated sheet, film, and/or matrix where the composition is released onto the surface by a releasing agent, such as water or other carrier. Additional examples include a pump sprayer, a trigger sprayer, a pressurized spraying device, a sponge, a squeegee, an airbrush, a brush, or a roller. The composition may alternatively be applied by spraying or dispersing over at least a portion of an agricultural area susceptible to infestation by sap-sucking insects, including but not limited to spraying from a tractor, irrigation spray, helicopter, crop duster, or airplane.

Another aspect of the current invention includes pretreatment of surfaces, objects, environments rich in sap-sucking insects, agricultural areas susceptible to infestation by sap-sucking insects, locations with high concentrations of plant or plant parts susceptible to damage by sap-sucking insects, and plants or portions of plants to prevent sap-sucking insects taking up residence and/or increasing in population size. This may be accomplished by coating the surfaces or objects with compositions that resist removal from the surface and contain an amount of a nootkatone, such as a paint, a clear coat, a wax, an oil, an adhesive, a resin, a cleaning solution, and combinations thereof. Another approach includes lining the surfaces, objects, environments rich in sap-sucking insects, including swarms, agricultural areas susceptible to infestation by sap-sucking insects, or locations with high concentrations of plant or plant parts susceptible to damage by sap-sucking insects with one or more nootkatone-impregnated materials, such as thermoplastic or thermoset sheets, paperboard, or cardboard impregnated with nootkatone. For example, a nootkatone-impregnated agrotextile may be used to at least partially enclose a plant growing area (including but not limited to a greenhouse or flower bed) or a transport container or receptacle, including boxes, bins, cartons, etc., or storage area for plants or portions of plants, such as barns, elevators, etc.

In a further embodiment, when the dispenser is a disposable thin sheet of material such as a tissue, a wet wipe, or a wet pad, such dispensers may be used to treat individual plant parts by physically removing sap-sucking insects, for example, by wiping. At the same time as the physical removal of the sap-sucking insects, a protective residue, layer, or film of nootkatone-containing composition is deposited on the treated surface to prevent reinfestation. In this way, treatment may be two-fold: physical removal and chemical removal and/or deterence. Such sheets of material may be prepackaged for use such as in resealable, liquid-impervious pouches.

A further treatment approach is to construct surfaces, objects, or storage or transport receptacles with nootkatone-impregnated or nootkatone-coated materials, such as plastics, wood, cloth, textiles, composites, or porous materials to prevent re-infestation of plants and agricultural equipment between harvests, plantings, or other suitable interval. Such an approach is particularly suitable for construction of furniture, greenhouses, agrotextiles, crates, boxes, vases, pots or bags suitable for growing, transporting or displaying plants. The approaches disclosed herein can be used alone or in any combination.

EXAMPLES

The Examples that follow are illustrative of specific embodiments of the invention, and various uses thereof. They are set forth for explanatory purposes only and are not taken as limiting the invention.

Example No. 1

Susceptibility of Aphids to Treatment with Nootkatone Formulations.

This example describes a laboratory bioassay in which groups of aphids were exposed to a nootkatone-containing composition to determine aphid susceptibility to nootkatone.

The organisms used for testing are shown in Table No. 3 below.

TABLE NO. 3

| Organisms used for testing. | | |
| --- | --- | --- |
| Name | Scientific name | Life stage/sex |
| Aphid | *Schizaphis gramium* | Adult/mixed sex |

Treatment

One milliliter of a 1% v/v nootkatone in ethanol was applied directly to 9 cm filter paper discs using a micropipette. The filter papers were allowed to dry completely and cut to the appropriate size prior to the start of the test. Pure ethanol was used as a control.

Test Container Design

Treated and untreated filter papers were cut into 2.5 inch (6.35 cm) squares and folded into envelopes to serve as containers for the test. Five replicates of 10 aphids were tested per treatment. After the aphids were placed inside, the openings were sealed using clips so that the aphids could not escape.

Assessments

Aphids were observed after 24 hours post-introduction to the test containers.

The aphids were scored according to the following criteria:

Knockdown: cannot right itself when placed on its back or otherwise initiate directional movement, but still exhibits movement in the limbs with or without tactile stimulation; or Dead (mortality): exhibits no movement, even with tactile stimulation.

Readings were discontinued if treated mortality reached 100%, or control mortality exceeded 20%.

Results

The results are shown in Table No. 4 below.

TABLE No. 4

Effects of Nootkatone Treatment on Aphids.

| Time post introduction | Means | | | Standard Error | | |
|---|---|---|---|---|---|---|
| | KD | Dead | Affected | KD | Dead | Affected |
| Untreated | | | | | | |
| 24 hours | 1.8 | 3.5 | 5.3 | 1.8 | 2.1 | 3.6 |
| Nootkatone | | | | | | |
| 24 hours | 6.0 | 94.0 | 100.0 | 6.0 | 6.0 | 0.0 |

Figure 2:
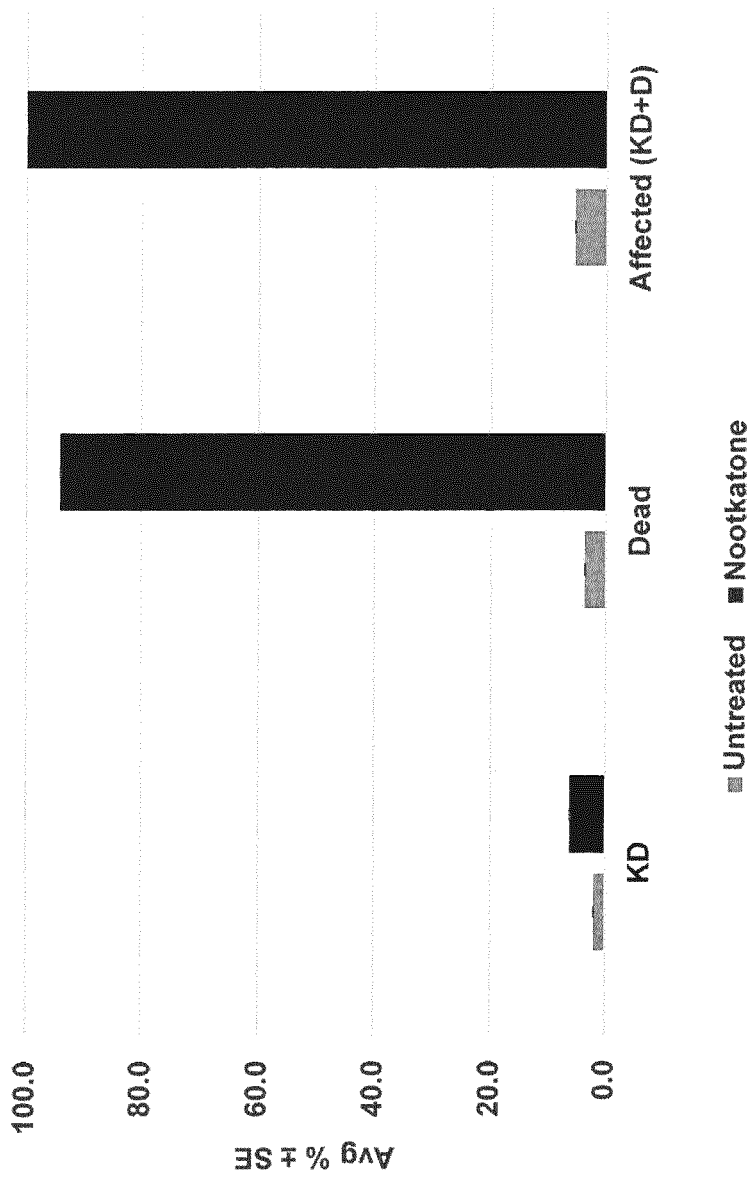
FIG. 2 illustrates percentages of knockdown (KD), dead, and affected aphids after 24 hr treatment with a nootkatone-containing composition compared to an ethanol-only control.

One of the control aphids was "knocked down" (KD), that is, it was able to move its limbs, but was unable to initiate directed movement. Two aphids in the control replicates died during the experiment. On average, the five control replicates had a 1.8% rate of KD, and a 3.5% rate of death, for a total 5.3% affected by 24 hours. In the five replicates that were exposed to 1% nootkatone, at the end of 24 hours of exposure, 6% were "knocked down," and 94% were killed, on average (see FIG. 2).

The test indicates very high mortality rates for aphids exposed to nootkatone compared to the control by 24 hour exposure. These data demonstrate that aphids are highly susceptible to low concentrations of nootkatone. Therefore, nootkatone-containing compositions can effectively treat and prevent aphid infestation of plants. These data further suggest that plant infestation by other sap-sucking insects can be effectively treated with nootkatone-containing compositions.

Example No. 2

Susceptibility of Common Insects to Treatment with Nootkatone Formulations.

This example describes a laboratory bioassay in which groups of house flies and red flour beetles were exposed to a nootkatone-containing composition to determine their susceptibilities to low concentrations of nootkatone.

The organisms used for testing are shown in Table No. 5 below.

TABLE NO. 5

Organisms used for testing.

| Name | Scientific name | Life stage/sex |
|---|---|---|
| House fly | Musca domestica | Adult/mixed sex |
| Red flour beetle | Tribolium castaneum | Adult/mixed sex |

Treatment

One milliliter of a 1% v/v nootkatone in ethanol was applied directly to 9 cm filter paper discs using a micropipette. The filter papers were allowed to dry completely and cut to the appropriate size prior to the start of the test. A negative control group (consisting of untreated replicates—ethanol only) was also assessed for comparative purposes.

Test Container Design

Treated and untreated filter papers were cut so that they covered the bottom of a suitable container for each test species as follows:

Flour beetles—Five replicates of 10 insects were tested. A Petri dish lid 3.54 inches (9 cm) in diameter was inverted and served as the substrate for a 2.75 inch (7 cm) treated filter paper circle. The small Petri dish bottom was inverted over the paper and had its sides treated with Fluon (or similar) to prevent climbing and force exposure with the filter paper. The entire Petri dish was enclosed with two rubber bands.

Flies—Five replicates of 10 insects were tested. Inverted 10 ounce (295 mL) clear plastic cups with a 0.5 inch (1.27 cm) hole burned into the center of the bottom, and with the sides coated with Fluon (or similar) were used as the treatment containers. The bottoms of the containers consisted of Petri dish lids 3.54 inches (90 cm) in diameter lined with a treated filter paper circle the same diameter. The cup was placed over the filter paper in the lid and both were secured in place using 2 rubber bands. The insects were introduced through the hole in the cup, and a plastic disc was placed over the opening to prevent escapes.

Assessments

Arthropods were observed at +30 minutes, and +1, +4, +24, +48, and +72 hours post-introduction to the test containers, except flies were not observed at the +4 hour time point. At each observation period, arthropods were scored according to the following criteria:

Knockdown: cannot right itself when placed on its back or otherwise initiate directional movement, but still exhibits movement in the limbs with or without tactile stimulation; or Dead (mortality): exhibits no movement, even with tactile stimulation.

Readings were discontinued if treated mortality reached 100%, or control mortality exceeded 20%.

Results

The results are shown in Tables No. 6 and 7 below.

TABLE No. 6

Effects of Nootkatone Treatment on Red flour beetles.
Red flour beetle

| Time post introduction | Means | | | Standard Error | | |
|---|---|---|---|---|---|---|
| | KD | Dead | Affected | KD | Dead | Affected |
| Untreated | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 0.0 | 0.0 | 0.0 | 0.0 | 0.0 | 0.0 |
| 24 hours | 2.0 | 0.0 | 2.0 | 2.0 | 0.0 | 2.0 |
| 48 hours | 0.0 | 2.0 | 2.0 | 0.0 | 2.0 | 2.0 |
| 72 hours | 6.0 | 2.0 | 8.0 | 4.0 | 2.0 | 5.8 |
| Nootkatone | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 0.0 | 0.0 | 0.0 | 0.0 | 0.0 | 0.0 |
| 24 hours | 4.2 | 0.0 | 4.2 | 2.6 | 0.0 | 2.6 |
| 48 hours | 0.0 | 6.4 | 6.4 | 0.0 | 4.4 | 4.4 |
| 72 hours | 0.0 | 10.9 | 10.9 | 0.0 | 8.6 | 8.6 |

TABLE No. 7

Effects of Nootkatone Treatment on House flies.

House flies

| Time post introduction | Means | | | Standard Error | | |
|---|---|---|---|---|---|---|
| | KD | Dead | Affected | KD | Dead | Affected |
| Untreated | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 24 hours | 20.0 | 2.0 | 22.0 | 4.5 | 2.0 | 3.7 |
| 48 hours | 4.0 | 40.0 | 44.0 | 2.4 | 6.3 | 6.8 |
| 72 hours | 2.0 | 44.0 | 46.0 | 2.0 | 6.8 | 6.0 |
| Nootkatone | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 0.0 | 0.0 | 0.0 | 0.0 | 0.0 | 0.0 |
| 24 hours | 12.0 | 2.0 | 14.0 | 3.7 | 2.0 | 5.1 |
| 48 hours | 0.0 | 28.0 | 28.0 | 0.0 | 9.7 | 9.7 |
| 72 hours | 2.0 | 42.0 | 44.0 | 2.0 | 8.0 | 7.5 |

These test results indicate that each insect species had similar mortality rates between treated and non-treated groups. Therefore, the data demonstrate that certain common insects are not susceptible to low concentrations (1% v/v) of nootkatone. Therefore, low concentration nootkatone-containing compositions can be used to effectively treat and prevent aphid infestation of plants with reduced concern of affecting other potentially beneficial insects. These data further suggest that plant infestation by sap-sucking insects can be safely and effectively treated by broadcasting or otherwise dispensing low concentration nootkatone-containing compositions in contrast to conventional pesticides.

Example No. 3

Susceptibility of Common Insects to Treatment with Nootkatone Formulations.

Based on the results of Example No. 2, this study sought confirmation that nootkatone compositions can be used to effectively treat and prevent aphid infestation of plants with reduced concern of affecting beneficial insects. The honey bee (Apis mellifera) is an important plant pollinator and is representative of other important beneficial insects. The honey bee was selected as the test species here based upon the past history of use, ease of rearing, and ecological importance as a pollinator.

Experimental Design

Young adult worker honey bees were exposed to a geometric series of five test doses of Nootkatone 98% (i.e., nootkatone ex valencene) ranging from 6.25 to 100 micrograms active ingredient per bee (μg ai/bee) administered topically in a 4 μL droplet to the dorsal side of the thorax of each bee. A negative control group and a solvent control group were maintained concurrently. Three replicate test chambers were maintained in each control and treatment group, with 10 bees in each test chamber. The nominal test concentrations were established based upon known toxicity information and OECD Guideline 214 recommendations. Additional groups of bees from the same source were nominally dosed with dimethoate, at 0.05, 0.10, and 0.30 μg a.i./bee as a positive control substance. The positive control test was conducted concurrently with the definitive test. Positive control doses were selected to approximate the $LD_{50}$ of dimethoate to honey bees based on the OECD 214 Guideline, which indicates the 24-hour contact $LD_{50}$ is between 0.10 to 0.30 μg a.i./bee (Organization for Economic Cooperation and Development. 1998. OECD Guidelines for Testing of Chemicals. Guideline 214, Honeybees, Acute Contact Toxicity Test). Observations of mortality and other signs of toxicity were made twice within the first four hours of dosing and then at approximately 24 and 48 hours. The cumulative mortality observed in the test groups was used to determine the $LD_{50}$, LOEC, and NOEC.

Materials and Methods

Preparation of Dosing Solutions

A primary stock was prepared by bringing 1.2626 g of Nootkatone 98% to 50 mL with acetone. The primary stock served as a dosing solution for the highest concentration (100 μg a.i./bee). Subsequent dosing solutions were prepared by proportional volumetric dilution of the primary stock with acetone (5, 2.5, 1.25 and 0.625 mL brought to 10 mL total volume using acetone) to prepare dosing solutions for the 50, 25, 12.5, and 6.25 μg a.i./bee treatment groups, respectively. The Nootkatone 98% doses were adjusted to 100% active ingredient based on a determined purity of 99.0%. A primary positive control stock solution was prepared by dissolving 0.1526 g of dimethoate (available from Chem Service, Inc.; CAS No. 60-51-5) in 10 mL of acetone. An aliquot (0.05 mL) of this primary stock was diluted to 10 mL with acetone to prepare the highest positive control dosing solution. Two lower-concentration positive control dosing solutions were prepared by serial dilution with acetone. The dimethoate doses were adjusted to 100% active ingredient based on the reported purity of 98.3%.

Test Organism

Honey bees used in the test were young adult worker bees collected from an apparently healthy hive. Frames of capped brood were collected from the hive and delivered to the laboratory in a wooden box, which was held in a holding incubator at a temperature of 33-34° C. and a relative humidity of 46 to 68%. Adult bees were allowed to emerge from the brood frames and feed on reserves of pollen and honey found on the frames until testing. Prior to dosing, young adult bees were removed from the frames, distributed into holding containers, and returned to the holding incubator. Approximately 50 bees were impartially placed in each of eight containers in preparation for use in the various treatment and control groups as needed during the dosing procedure.

Test Chambers

The test chambers were stainless steel cylinders measuring approximately 9 cm in diameter and 9 cm high, with perforations for ventilation. Each end of the test chamber was covered with a disposable plastic petri dish (approximately 10 cm in diameter), and the bottom petri dish was lined with filter paper. An inverted glass vial containing approximately 10 mL of 50% (w/v) sucrose solution was inserted through the lid of the chamber. The opening of the vial was covered with gauze, which prevented leakage allowing the bees to feed ad libitum throughout the test period. The test chambers were identified by study number, dosage group, and replicate.

Dose Administration

Prior to dosing, the bees in each holding container were immobilized with nitrogen. While anesthetized, bees were individually dosed with the appropriate dosing solution. Bees in the test substance, positive control, and solvent control groups were dosed by administering a 4 μL droplet of the appropriate dosing solution to the dorsal side of the thorax of each bee with an adjustable micropipette. Ten bees were impartially placed in each test chamber. Bees in the positive control treatment group were handled and dosed in the same manner. Solvent control bees were dosed with acetone. Negative control bees were not dosed but were handled identically to the treated bees. After dosing, test chambers were distributed into a testing incubator by indiscriminate draw.

Environmental Conditions

During the test, the bees were maintained in an incubator with a temperature range of 25 to 26° C. and a relative humidity range of 57 to 72%. The bees were maintained in continuous darkness during the test except during periods of dosing and observations.

Observations

The bees were observed and counted periodically to evaluate mortality and signs of toxicity or abnormal behavior. Observations were made twice within the first four hours and at approximately 24 and 48 hours after the completion of dosing.

Data Analysis

There was less than 50% mortality in each of the Nootkatone 98% treatment groups at test termination, which precluded the statistical calculation of an $LD_{50}$ value. Therefore, the $LD_{50}$ value for Nootkatone 98% was estimated to be greater than the highest concentration tested. The Lowest Observable Effect Concentration (LOEC) and the No Observable Effect Concentration (NOEC) were determined by statistical analysis of the mortality data with the Fisher Exact Test of SAS Version 9.4 (SAS Institute, Inc. 2002-2012. SAS Proprietary Software Version 9.4, Cary, N.C., SAS Institute, Inc.) and by visual interpretation of the mortality data. The negative control group was used for comparison with the treatment groups. Mortality data for the dimethoate positive control groups were analyzed to calculate the 24-hour $LD_{50}$ value by linear interpolation using CETIS (Tidepool Scientific Software. 2011. Users Guide, Comprehensive Environmental Toxicity Information System (CETIS). Tidepool Scientific Software, McKinleyville, Calif.).

Results and Discussion

Mortality and Observations

Results of the contact test with Nootkatone 98% are summarized in Table No. 8. Mortality in the Nootkatone treatment groups at the end of the test ranged from 0 to 13.3%, and was considered incidental to treatment. Therefore, the $LD_{50}$ for honey bees exposed to Nootkatone 98% was determined to be greater than 100 μg a.i./bee. Based upon visual observation of the mortality data and comparison of the treatment groups to the negative control with the Fisher's Exact Test, the LOEC was determined to be greater than 100 μg a.i./bee and the NOEC was 100 μg a.i./bee, the highest concentration tested. One surviving bee was observed to be lethargic at 48 hours, However, this symptom was considered to be incidental to treatment. The 24-hour $LD_{50}$ value for honey bees exposed to dimethoate was determined to be 0.103 μg ailbee with a 95% confidence interval of 0.0954 to 0.1102 μg allbee, This value was within the desired range of 0.10 to 0.30 μg a.i./bee (U.S. Environmental Protection Agency. 2012. Series 850—Ecological Effects Test Guidelines, OCSPP Number 850.3020: Honey Bee Acute Contact Toxicity Test).

TABLE NO. 8

Effects of Nootkatone Treatment on Honey Bees.

| Treatment Group (μg a.i./bee) | Rep. | 48-hour Mortality (%) | Mean (%) |
|---|---|---|---|
| Negative Control | A | 0 | 3.3 |
| | B | 10 | |
| | C | 0 | |

TABLE NO. 8-continued

Effects of Nootkatone Treatment on Honey Bees.

| Treatment Group (μg a.i./bee) | Rep. | 48-hour Mortality (%) | Mean (%) |
|---|---|---|---|
| Solvent Control | A | 0 | 0 |
| | B | 0 | |
| | C | 0 | |
| 6.25 | A | 0 | 10 |
| | B | 10 | |
| | C | 20 | |
| 12.5 | A | 0 | 10 |
| | B | 10 | |
| | C | 20 | |
| 25 | A | 0 | 0 |
| | B | 0 | |
| | C | 0 | |
| 50 | A | 0 | 3.3 |
| | B | 0 | |
| | C | 10 | |
| 100 | A | 10 | 13.3 |
| | B | 20 | |
| | C | 10 | |
| Positive Control[1] 0.05 | A | 0 | 0 |
| | B | 0 | |
| | C | 0 | |
| Positive Control[1] 0.10 | A | 60 | 60 |
| | B | 50 | |
| | C | 70 | |
| Positive Control[1] 0.30 | A | 100 | 100 |
| | B | 100 | |
| | C | 100 | |

[1]Positive Control mortality was evaluated 24 hours after dosing.

Validity Criteria

The test was considered to be acceptable based on the validity criteria. The control mortality was less than 10% for both the negative and solvent control groups (3.3 and 0%, respectively). The 24-hour $LD_{50}$ for the positive control was within the desired range of 0.10 to 0.30 μg a.i./bee (2). These results indicate that the bees used in this test were sensitive to contact exposure of a known toxin and served to confirm that the procedures used to administer the doses were effective. Therefore, the test was considered valid.

Conclusions

The 48-hour acute contact $LD_{50}$ and the LOEC values for honey bees exposed to Nootkatone 98% were determined to be greater than the nominal dose of 100 μg a.i./bee. The NOEC was 100 μg a.i./bee, the highest concentration tested. These data confirm that nootkatone when used at concentrations that are effective against sap sucking insects does not appear to be harmful to bees. These results demonstrate that the nootkatone used herein (i.e., nootkatone ex valencene) can be an effective insecticide while also protecting pollinator insects, such as honey bees.

Example No. 4

Determining Nootkatone Concentrations for Crop-Safe Protective Nootkatone-Containing Compositions In this example, concentration titration is performed to determine effective concentrations of nootkatone in nootkatone-containing protective composition that do not harm crop plants.

Formulations such as, but not limited to those in Table No. 2, and following the general form as in Table No. 1 are tested for plant safety. Vigorous plants have a control and a treatment formulation applied by spraying, dipping, or painting to at least three leaves each. The control and treated leaves are clearly marked. If only a portion of a leaf is treated, that portion is clearly marked. After 24 hours, the health of treated and control leaves, and overall vigor of the plant is evaluated.

Example No. 5

Determining Effective Nootkatone Concentrations for Aphid Repellent Nootkatone-Containing Compositions In this example, concentration titration is performed to determine effective concentrations of nootkatone for repelling aphids from crop plants.

The methods of Halbert et al. (Plant-derived Compounds and Extracts with Potential as Aphid Repellents, Annals of Applied Biology, 154: 303-307, 2009) are used to assess repellency of a range of formulations, such as, but not limited to, those listed in Table No. 2. Briefly, a cubical arena with a stark white interior, an access opening on one side, and aphid-proof viewports on each side is used for all tests. Dark green colored, 5 $cm^2$ tiles are coated with petroleum jelly alone, or petroleum jelly mixed immediately before use with an appropriate treatment. Treatments may include formulations containing a range of concentrations of nootkatone in a carrier, with or without inert ingredients, such as, but not limited to, those listed in Table No. 2. Up to six pairs of treated and untreated tiles are placed randomly in the test arena, and 50 winged aphid adults are released into the arena. After 24 hours, the number of aphids trapped on treated versus untreated tiles is scored, and the per-tile scores are averaged to obtain overall averages of capture. At least three replicate experiments are conducted per treatment. The data for controls versus treatments are analyzed using paired t-tests.

Example No. 6

Determining Duration of Crop Protection from Aphids by Nootkatone-Containing Compositions In this example, nootkatone-containing compositions are formulated to maximize duration of crop protection by at feast one of killing or repelling aphids.

Appropriate host plants for sap-sucking insect species are treated with formulations that have been found to be safe for the plant species, as in Example 4, and are effective in killing or repelling sap-sucking insects, such as aphids or thrips, as in Example 1 and/or Example 5. Treatment is by either dipping or by thoroughly spraying the plant with the test formulation, water alone, or water together with inert formulation ingredients, as controls. The treatment time and date are noted for each plant. After waiting the desired number of hours, days, or weeks, leaves are collected from treated and control plants and are marked for later identification.

For tests of continued killing, the method of Example 1 is used.

For tests of continued repellency, a modification of IRAC (Insecticide Resistance Action Committee) test method 019 is used. Briefly, vented test arenas are made as in IRAC test method 019 using Petri dishes and agar. A treated and an untreated leaf are each labeled and placed into a single test arena with each leaf cut to fit half of the arena, leaving a small gap in between. Twenty to thirty apterous adult aphids are introduced into the gap between treated leaves, and the arena is sealed. After 24 hours, the arena is opened, and the number of aphids on each half of the arena is scored, noting whether the insects are active, morbid, or dead.

Example No. 7

Prevention of Aphid Egg Hatching

In this example, nootkatone-containing compositions are formulated to prevent hatching of aphid eggs on crop plants.

Egg preparation. Male and female adult aphids are collected from infected host leaves, and eggs are collected as in Komazaki (Collection and Hatching Methods of the Aphid, Aphis spiraecola PATCH, Eggs in the Laboratory, Appl. Entomol. Zool. 30(1): 97-101, 1995). Briefly, a damp filter paper is placed in the bottom of a cup, to which 10 to 25 adult female aphids and 2-4 adult male aphids are added. The cup is covered with a filter paper, over which a piece of aluminum foil is placed to block light. The upper filter paper and foil are secured using rubber bands. The apparatus is maintained at 20° C., and eggs are collected on days 2-6 after confinement. Eggs are sterilized with 1% formaldehyde 5-7 days after oviposition, after which they are maintained for 7 days at 14° C., prior to use. If necessary, eggs are maintained for extended periods at 6.4° C.

Egg hatching experiments. Eggs prepared as above, or eggs obtained from a reputable source, are divided into cohorts of 20-25 eggs. Each cohort is placed onto the leaf of a species-appropriate host plant inside a Petri dish after receiving mock treatment or a true treatment with nootkatone (see "Treatments"), after which the dish is sealed and held at 14° C. to allow hatching. Hatching is scored after 72 hours. A minimum of 4 cohorts is tested per treatment.

Treatments. Formulations containing a range of concentrations of nootkatone in a carrier, with or without inert ingredients, such as, but not limited to, those listed in Table No. 2, are sprayed onto eggs. Control egg cohorts are treated using carrier alone, or carrier with all inert ingredients.

Results

The rate of egg hatching is calculated for each treatment and control egg cohort, and the results of at least 4 cohorts are averaged per treatment, and used to calculate the relative hatch rate for treatments versus controls.

Example No. 8

Comparison of Fermentation-Derived Nootkatone with Citrus-Derived Nootkatone

Overview

Figure 3:
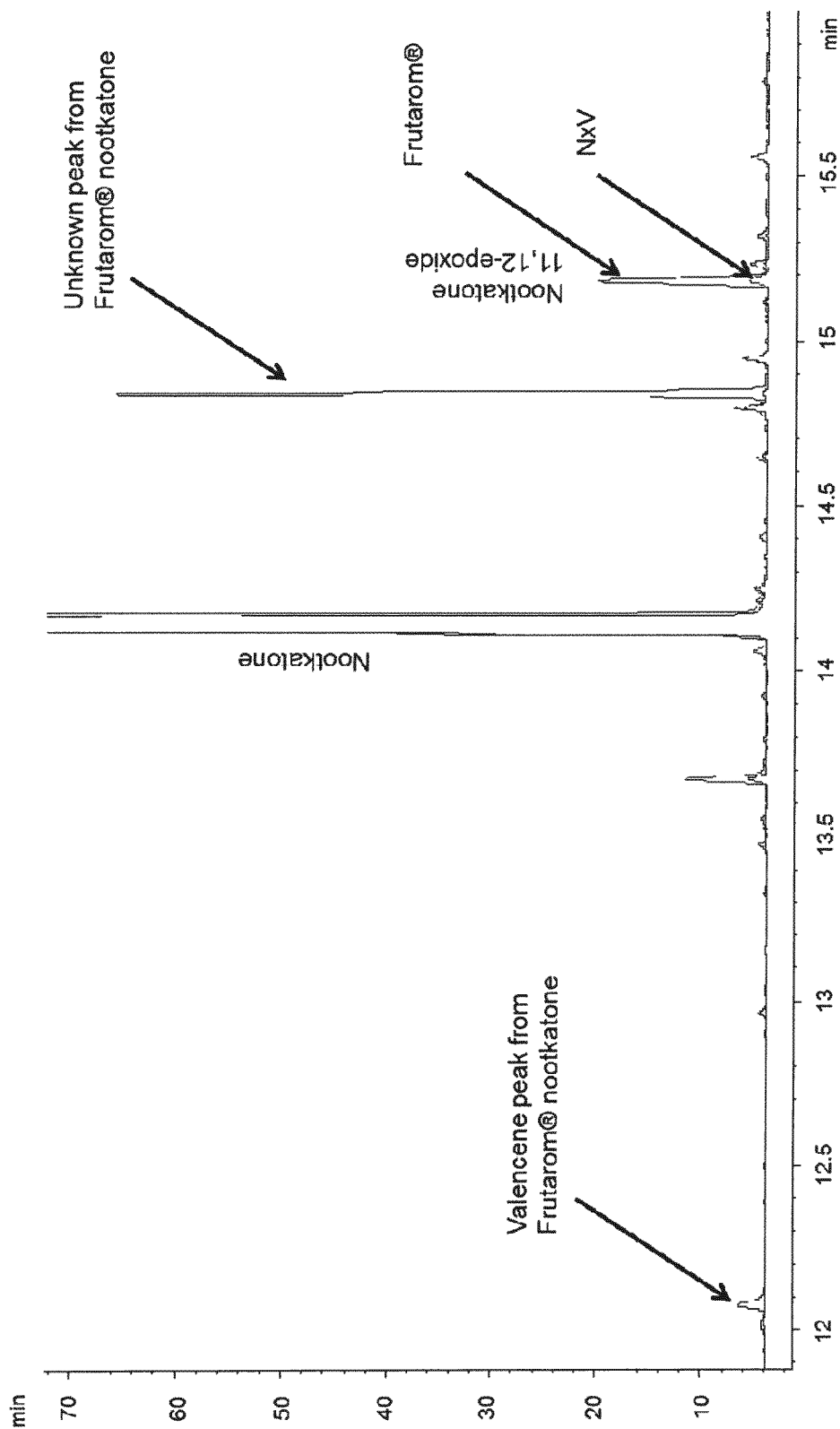
FIG. 3 is GC-FID chromatogram overlay of Frutarom® nootkatone (i.e., citrus-derived nootkatone) and the nootkatone (N×V) used for the treatments and pre-treatment of sap-sucking insect studies described herein (see Examples below).
Figure 4:
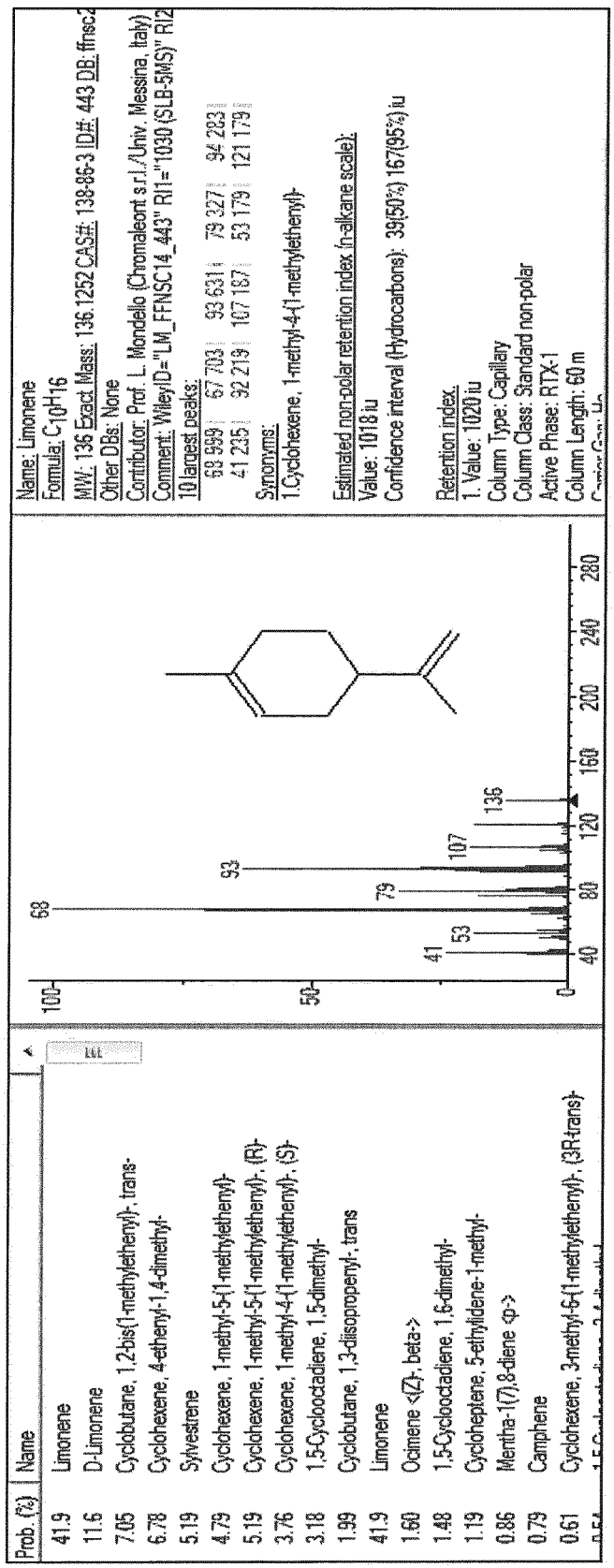
FIG. 4 is a GC-MS NIST library match of an unknown peak in Frutarom® nootkatone. The peak was identified as limonene. No limonene nor bergapten was found in the nootkatone used in the present application.

Nootkatone, as defined herein, has a particular chemical profile indicative of its constituent chemical species. Other sources of nootkatone can have different chemical profiles and therefore actually represent different chemical compositions. GC-FID analyses of the nootkatone used in the studies described above (obtained from oxidation of fermentation-derived valencene, also known as, nootkatone ex valencene (NxV)) and a citrus fruit-derived nootkatone (also known as nootkatone ex citrus, which is derived from citrus fruit and available from Frutarom®, Corona, Calif.) are shown in FIG. 3. The nootkatone used in the studies described herein lacked valencene and demonstrated a lower amount of 11,12-epoxide than the Frutarom® nootkatone. Moreover, further analysis of an unknown peak from the Frutarom® nootkatone sample revealed that the Frutarom® sample contained limonene (see FIG. 4), whereas the nootkatone used in the present studies was limonene-free. These results underscore the different chemical profile of the nootkatone used herein (NxV) compared to commercially-available nootkatone derived from citrus, such as that provided by Frutarom®.

These results are also in accord with the observation (not shown) that nootkatone obtained from fermentation-derived valencene does not contain bergapten (or bergaptine). Bergapten (5-methoxypsoralen or 5-MOP) is a compound found in bergamot and citrus essential oils that causes phototoxicity in humans. (Gionfriddo et al. "Elimination of Furocoumarins in Bergamot Peel Oil," *Perfumer & Flavorist.*, 2004; 29:48-52; Ferreira Maia et al. "Plant-based insect repellents: a review of their efficacy, development and testing," Malaria Journal, 2011; 10:Suppll-11; and Kejlová et al. "Phototoxicity of bergamot oil assessed by in vitro techniques in combination with human patch tests." Toxicol In Vitro. 2007; 21:1298-1303). In addition, GHS health warning statements for bergapten indicate that it can cause allergic skin reactions, allergy or asthma symptoms, or breathing difficulties if inhaled, and can cause genetic defects or cancer in animals. For such reasons, a Cosmetic Ingredient Review expert panel in assessing the safety of 14 citrus-derived peel oil ingredients concluded no more than 0.0015% (15 ppm) bergapten should be included in cosmetic products (see "Safety Assessment of Citrus-Derived Peel Oils as Used in Cosmetics," Cosmetic Ingredient Review Expert Panel Final Report, September 30, 2014: 1-31).

Bergapten is present in naturally derived valencene (from citrus) and carries over through the chemical oxidation that forms nootkatone. Bergapten can be photo-activated to become a skin irritant, which can be worse around an open wound or particularly sensitive membranes of the body, including without limitation the mucous membranes of the mouth, lungs and/or gastro-intestinal tract. Bergapten-associated adverse reactions in the lungs of agricultural workers or agricultural produce workers repeatedly exposed to photo-activated bergapten could lead to health complications such as irritation or breathing difficulties. Bergapten-associated adverse reactions resulting from ingested plant material contacted with bergapten could lead to buccal or intestinal discomfort and/or if ingested repeatedly, could mask or give false positives for food allergies. Therefore, bergapten-free nootkatone obtained from fermentation-derived valencene has particular advantages over plant-derived nootkatone and is preferable for contacting plants, plant parts, or surfaces humans may come into contact with.

Example No. 9

Production of Nootkatone ex Valencene

Nootkatone ex valencene may be produced in vivo through expression of one or more enzymes involved in the nootkatone biosynthetic pathway in a recombinant yeast or in vitro using isolated, purified enzymes involved in the nootkatone biosynthetic pathway, such as those described in U.S. Patent Application Publication Nos. 2015/0007368 and 2012/0246767. The final conversion of valencene to nootkatone may be done enzymatically in vivo or in vitro, or may be performed by chemical oxidation (typically inorganic) in vitro.

Briefly, the valencene synthase gene (CVS) from *Citrus sinensis* cv. Valencia (Valencia orange) was cloned from RNA isolated from the juice vesicles of freshly harvested Valencia orange using the procedure previously described in Example 1 of U.S. Pat. No. 7,442,785.

First, Yep-GW-URA (Takahashi et al., (2007) *Biotechnol Bioeng.* 97(1):170-181) was generated by inserting a gateway cloning cassette (RfB) with the form attR1-Cm$^R$-ccdB gene-attR2 (Hartley et al,, (2000) Genome Res. 10:1788-1795) into the SmaI restriction site of YEp352-URA (Bio-Technical Resources), which contains an URA3 selectable marker, an ADH1 promoter and an ADH1 terminator flanking, two BamHl sites (one 5' to the ADH1 promoter and the other 3' to the ADH terminator), a 2-micron ori, an ampicillin resistance gene and a colE1 origin of replication. The resulting vector was designated YEp-CVS-URA.

The CVS gene (set forth in SEQ ID NO: 1, and encoding amino acid sequence is set forth in SEQ ID NO: 2) was then amplified from RNA isolated from the juice vesicles of freshly harvested Valencia orange to contain restriction sites for subcloning into the yeast shuttle expression vector Yep-GW-URA. Following digestion of Yep-GW-URA with EcoRI and XbaI, the amplified product was cloned into the yeast shuttle expression vector YEp-GW-URA.

The YEp-CVS-ura vector was maintained in *S. cerevisiae* by selecting on SD minimal medium lacking uracil at 28° C. The vector also was maintained in *Escherichia coil* by selecting for resistance to ampicillin on LB medium containing 100 µg/mL ampicillin.

To screen for production of valencene, the *Saccharomyces cerevisiae* yeast cell strains CALI5-1 (ura3, leu2, his3, trp1, Δerg9::HIS3, HMG2cat/TRP1::rDNA, dpp1, sue), ALX7-95 (ura3, his3, trp1, Δerg9::HIS3, HMG2cat/TRP1::rDNA, dpp1, sue) or ALX11-30 (ura3, trp1, erg9def25, HMG2cat/TRP1::rDNA, dpp1, sue) were used.

The CALI5-1 strain (see U.S. published Appl. No. US20040249219; U.S. Pat. Nos. 6,531,303 and 6,689,593) has a Δleu2 deletion, which required the introduction of leucine into its media, ALX7-95 was derived from CALI5-1 by correcting the Δleu2 deficiency of CALI5-1 with a functional LEU2 gene (see U.S. published Appl. No. US2010/0151519).

ALX11-30 was constructed from CALI5-1 in several steps from ALX7-175.1 as described in US2010/0151519. Briefly, ALX7-95 HPS was obtained by transforming a plasmid containing the *Hyoscyamus muticus* premnaspirodiene synthase (HPS) into ALX7-95 strain. The YEp-HPS plasmid was obtained by cloning the gene for HPS into Yep-GW-URA to give YEp-HPS-ura (YEp-HPS). Then, an error prone PCR reaction of the ERGS gene was performed, and the resulting DNA was transformed into ALX7-95 harboring YEpHPS. Transformants were plated on YP medium lacking ergosterol and screened for premnaspirodiene production. Those that produced high levels of premnaspirodiene were saved. One strain, ALX7-168.25 [ura3, trp1, his3, erg9$^{def}$25, HMG2cat/TRP1::rDNA, dpp1. sue, YEpHPS] was transformed with a PCR fragment of the complete HIS3 gene to create a functional HIS3 gene. Transformants were isolated that were able to grow in the absence of histidine in the medium. From this transformation, ALX7-175.1 was isolated [ura3, trp1, erg9def25, HMG2cat/TRP1::rDNA, dpp1, sue YEpHPS]. Finally, the plasmid YEpHPS was removed by growing ALX7-175.1 several generations in YPD (10 g/L yeast extract, 20 g/L peptone, 20 g/L glucose) and plating cells on YPD plates. Colonies were identified that were unable to grow on SD medium without uracil (0.67 Bacto yeast nitrogen base without amino acids, 2% glucose, 0.14% yeast synthetic drop-out medium without uracil). This strain was designated ALX11-30.

For screening for production of valencene by valencene synthase or mutants, the YEp-CVS-ura plasmid, containing the CVS gene or modified versions of the CVS gene, was transformed into the above yeast strains using the lithium acetate yeast transformation kit (Sigma-Aldrich). The ALX7-95 and ALX11-30 strains generally produced more valencene than the CAL15-1 strain. CALI5-1 was used for initial screening in vials (as described in Example 3) and production in fermenters. Subsequently, ALX7-95 or ALX11-30 were used for screening in vials and fermenters.

Typically, ALX7-95 was used for screening in vials and ALX11-30 was used for fermenters.

Transformants were selected on SDE-ura medium (0.67% Bacto yeast nitrogen base without amino acids, 2% glucose, 0.14% yeast synthetic drop-out medium supplement without uracil, and 40 mg/L ergosterol as needed). Colonies were picked and screened for valencene production using the microculture assay described below.

Production of valencene was performed in a 3-L fermentation tank (New Brunswick Bioflow 110). One liter of fermentation medium was prepared and autoclaved in the fermentation tank (20 g $(NH_4)_2SO_4$, 20 g $KH_2PO_4$, 1 g NaCl, $MgSO_4 \cdot 7H_2O$, 4 g Solulys corn steep solids (Roquette)). The following components were then added: 20 ml mineral solution (0.028% $FeSO_4 \cdot 7H_2O$, 0.029% $ZnSO_4 \cdot 7H_2O$, 0.008% $CuSO_4 \cdot 5H_2O$, 0.024% $Na_2MoO_4 \cdot 2H_2O$, 0.024% $CoCl_2 \cdot 6H_2O$, 0.017% $MnSO_4 \cdot H_2O$, 1 mL HCl); 10 mL 50% glucose; 30 mL vitamin solution (0.001% biotin; 0.012% calcium pantothenate, 0.06% inositol. 0.012% pyridoxine-HCl, 0.012% thiamine-HCl); 10 mL 10% $CaCl_2$, and 20 mL autoclaved soybean oil (purchased from local groceries). For sterol-requiring strains, including CALI5-1 and ALX7-95, 50 mg/L cholesterol or 40 mg/L ergosterol was included in the medium.

The seed culture for inoculating the fermentation medium was prepared by inoculating 50 mL of SDE-ura-trp medium (see Example 3.C.2.) with CALI5-1, ALX7-95 or ALX11-30 containing the YEp-CVS-ura plasmid. This culture was grown at 28° C. until early stationary phase (24-48 hr). One mL of this culture was inoculated into 500 mL of SDE-ura-trp medium and grown for 24 hr at 28° C. A 50-mL aliquot (5% inoculum) was used to inoculate the medium in the fermentation tank.

The fermentor was maintained at 28° C. The air flow was 1 vvm and the $dO_2$ was maintained above 30% by adjusting the agitation. The pH was maintained at 4.5 using phosphoric acid and NaOH or $NH_4OH$.

When the glucose concentration fell below 1 g/L, a feeding regimen was initiated such that the glucose in the fermentor was kept between 0 and 1 g/L. The glucose feed consisted of 60% glucose (w/v).

At the end of the fermentation, generally about 132 hours after inoculation, sodium sulfate was added to 10-15% final concentration as was an additional 50 mL soybean oil. and the contents of the fermentor were agitated for one hour. After allowing the fermentation vessel contents to settle, the oil was recovered by centrifugation and the valencene content in the oil was determined.

To assay valencene, 3 mL of suspension was placed in a vial to which 3 mL of acetone containing 20 mg/L cedrene was added. After vortexing, the mixture was extracted with 6 mL hexane containing 10 mg/L hexadecane followed by additional vortexing. The organic phase was transferred to a second vial for analysis by gas chromatography using cedrene and hexadecane as internal standards for extraction efficiency and injection, respectively. The CALI5-1, ALX7-95 or ALX11-30 S. cerevisiae containing Yep-CVS-ura, and expressing valencene synthase, was found to produce valencene.

The valencene-containing soybean oil, produced by fermentation as described above, was concentrated and purified using wiped-film distillation at 100° C. and 350 mTorr to generate an oil that contained approximately 68% valencene by weight. This material was converted to nootkatone by two different methods described below.

A. Oxidation of Valencene to Nootkatone Using Chromium Trioxide

The valencene distillate produced as described above was oxidized to nootkatone using chromium trioxide and pyridine in dicholoromethane as follows. Chromium trioxide (369 g, 3.69 mol, 22 eq) was added in portions to a solution of pyridine (584 g, 7.4 mol, 44 eq) in 5 L of dichoromethane. The mixture was stirred for 10 minutes, 50 grams of valencene distillate (68% w/w. 0.167 mol, 1 eq) was added over four minutes, and the mixture was stirred at 22' C. for 18 hours. The liquor was drained from the vessel, and the solids were washed twice with 2 L of methyl tert-butyl ether (MTBE). The combined organic layers were further diluted with 2 L of MTBE and successively washed three times with 1.25 L of 5% sodium hydroxide, twice with 2 L of 5% hydrochloric acid, and once with 2 L of brine. The organic phase was dried over 200 grams of anhydrous sodium sulfate, filtered, and concentrated by evaporation to give 36.8 grams crude nootkatone (48% w/w, 0.081 mol, 48% yield).

B. Oxidation of Valencene to Nootkatone Using Silica Phosphonate-Immobilized Chromium (III) Catalyst Silica phosphonate chromium (III) resin (48.9 g, PhosphonicS, Ltd.) was placed in a 5 L round bottom flask equipped with a condenser, thermowell, overhead stirrer, and sparge tube. Two (2) L of t-butanol and valencene distillate (68%, 500 g, 1.67 moles, 1 eq) were added, the contents were heated to 45° C., and the heterogeneous suspension was allowed to stir as oxygen was sparged through the solution (ca 1.5 L/min) and nitrogen flushed over the head-space. 70% t-butyl hydroperoxide in water (TBHP, 315 g, 2.45 moles, 1.47 eq) was added to the solution over 2 hrs while the temperature of the reaction was heated and maintained at 60±5° C. The reaction was allowed to stir until >90% of the valencene was consumed, as determined by gas chromatography. The reaction was then allowed to cool to room temperature and the silica catalyst removed by filtration. The flask and resin were washed with 500 mL isopropanol. One (1) L of deionized water was added to the combined organic solution (t-butanol and isopropanol), and the mixture was concentrated under reduced pressure by evaporation to afford an amber colored oil. The oil was dissolved in 3 L of toluene and washed with 3.125 L of 15% sulfuric acid for 15 minutes with vigorous agitation. The aqueous layer was removed and re-extracted with 1 L of toluene. The combined toluene layers were then washed three times with 2.5 L of 1 M sodium hydroxide, twice with 500 mL saturated sodium chloride, and dried over anhydrous magnesium sulfate. After filtration, the solvent was removed under reduced pressure by evaporation to afford 378 g of viscous amber oil (33% nootkatone by weight, 0.57 moles, 34% yield).

Sequence Listing:

SEQ ID NO: 1 (Citrus valencene synthase)
atgtcgtctggagaaacatttcgtcctactgcagatttccatcctagttt
atggagaaaccatttcctcaaaggtgcttctgatttcaagacagttgatc
atactgcaactcaagaacgacacgaggcactgaaagaagaggtaaggaga
atgataacagatgctgaagataagcctgttcagaagttacgcttgattga
tgaagtacaacgcctgggggtggcttatcactttgagaaagaaatagaag
atgcaatacaaaaattatgtccaatctatattgacagtaatagagctgat
ctccacaccgtttcccttcattttcgattgcttaggcagcaaggaatcaa
gatttcatgtgatgtgtttgagaagttcaaagatgatgagggtagattca
agtcatcgttgataaacgatgttcaagggatgttaagtttgtaegaggca
gcatacatggcagttcgcggagaacatatattagatgaagccattgcttt
cactaccactcacctgaagtcattggtagctcaggatcatgtaacccta
agcttgcggaacagataaatcatgctttataccgtcctcttcgtaaaacc

```
ctaccaagattagaggcgaggtattttatgtccatgatcaattcaacaag
tgatcatttatacaataaaactctgctgaattttgcaaagttagatttta
acatattgctagagctgcacaaggaggaactcaatgaattaacaaagtgg
tggaaagatttagacttcactacaaaactaccttatgcaagagacagatt
agtggagttatattttgggatttagggacatacttcgagcctcaatatg
catttgggagaaagataatgacccaattaaattacatattatccatcata
gatgatacttatgatgcgtatggtacacttgaagaactcagcctcttac
tgaagcagttcaaagatggaatattgaggccgtagatatgcttccagaat
acatgaaattgatttacaggacactcttagatgcttttaatgaaattgag
gaagatatggccaagcaaggaagatcacactgcgtacgttatgcaaaaga
ggagaatcaaaaagtaattggagcatactctgttcaagccaaatggttca
gtgaaggttacgttccaacaattgaggagtatatgcctattgcactaaca
agttgtgcttcacacattcgtcataacaaattccttccttggcatgggtga
ttttgcaactaaagaggttttgaatggatctccaataacccctaaggttg
taaaagcagcatcagttatctgcagactcatggatgacatgcaaggtcat
gagtttgagcagaagagagacatgttgcgtcagctattgaatgttacac
gaagcagcatggtgtctctaaggaagaggcaattaaaatgtttgaagaag
aagttgcaaatgcatggaaagatattaacgaggagttgatgatgaagcca
accgtcgttgcccgaccactgctcgggacgattcttaatcttgctcgtgc
aattgattttatttacaaagaggacgacggctatacgcattcttacctaa
ttaaagatcaaattgcttctgtgctaggagaccacgttccattttga SEQ ID NO: 2 (Citrus valencene synthase)
MSSGETFRPTADFHPSLWRNHFLKGASDFKTVORTATQERHEALKEEVRR
MITDAEDKPVQKLRLIDEVQRLGVAYHFEKEIEDAIQKLCPIYIDSNRAD
LHTVSLHFRLLRQQGIKISCDVFEKFKDDEGRFKSSLINDVQGMLSLYEA
AYMAVRGEHILDEAIAFTTTHLKSLVAQDHVTPKLAEQINHALYRPLRKT
LPRLEARYFMSMINSTSDHLYNKTLLNFAKLDFNILLELHKEELNELTKW
WKDLDFTTKLPYARDRLVELYFWDLGTYFEPQYAFGRKIMTQLNYILSII
DDTYDAYGTLEELSLFTEAVQRWNIEAVDMLPEYMKLIYRTLLDAFNEIE
EDMAKQGRSHCVRYAKEENQKVIGAYSVQAKWFSEGYVPTIEEYMPIALT
SCAYTFVITNSFLGMGDFATKEVFEWISNNPKVVKAASVICRLMDDMQGH
EFEQKRGHVASAIECYTKQHGVSKEEAIKMFEEEVANAWKDINEELMMKP
TVVARPLLGTILNLARAIDFIYKEDDGYTHSYLIKDQIASVLGDHVPF
```

Having described the invention in detail and by reference to specific embodiments thereof, it will be apparent that modifications and variations are possible without departing from the scope of the invention defined in the appended claims. More specifically, although some aspects of the present invention are identified herein as particularly advantageous, it is contemplated that the present invention is not necessarily limited to these particular aspects of the invention. Percentages disclosed herein may otherwise vary in amount by ±10, 20, or 30% from values disclosed herein.

What is claimed is:

1. A method of treating a sap-sucking insect infestation or reducing the population of sap-sucking insects on a plant by applying a composition, wherein said treatment is associated with a reduced risk for skin irritation for a human or animal coming into contact with the composition, the method comprising:
applying an effective amount of a nootkatone-containing composition to a surface or area to be treated,
wherein the nootkatone is derived from oxidation of valencene that was produced by fermentation,
wherein the nootkatone is nootkatone ex valencene,
wherein the nootkatone ex valencene is limonene- and bergapten-free, and
wherein the applied nootkatone ex valencene-containing composition comprises about 0.1% to about 10% nootkatone ex valencene, and
wherein the nootkatone-containing composition has a reduced risk for causing skin irritation when applied topically compared to a nootkatone composition containing nootkatone that is neither limonene- nor bergapten-free.

2. The method of claim 1, wherein the nootkatone ex valencene-containing composition is applied to the surface or area to be treated by an aerosol container with a spray nozzle, a spray gun, an impregnated sheet, a film, a matrix, a pump sprayer, a trigger sprayer, a pressurized spraying device, a sponge, a brush, a roller, a tractor, an irrigation spray, a helicopter, a crop duster, or an airplane.

3. The method of claim 1, wherein the surface or area to be treated is a surface of a plant, soil, a planting bed, hydroponics equipment, harvesting equipment, an agricultural tool, a storage container, a shipping container, or an area susceptible to infestation by sap-sucking insects.

4. The method of claim 3 further comprising applying the dispenser to a surface to be treated, to a plant surface, or to an area susceptible to infestation by sap-sucking insects.

5. The method of claim 3, wherein the plant surface, the surface to be treated, or the area susceptible to infestation by sap-sucking insects is within an agricultural area, an agricultural field, an arable field, a greenhouse, an area for mushroom cultivation, an indoor area of commercial flower cultivation, a commercial forest, a grassy area subjected to professional grass management, or a private lawn.

6. The method of claim 1, wherein the nootkatone ex valencene-containing composition is applied to the surface to be treated by a dispenser,
wherein the dispenser is adapted to concomitantly apply the composition to the surface and physically remove at least one sap-sucking insect from the surface.

7. The method of claim 6, wherein the dispenser is a tissue, a wet wipe, a wet pad, a suction device, or a water dispenser.

8. The method of claim 1, wherein the nootkatone ex valencene-containing
composition is applied to the surface to obtain an effective nootkatone concentration of about 0.15 mg/cm$^2$.

9. The method of claim 1, wherein the nootkatone ex valencene-containing composition comprises:
(a) about 0.1% to about 10% nootkatone ex valencene; and
(b) about 90% to about 99.9% carrier.

10. The method of claim 9, wherein the nootkatone ex valencene-containing composition comprises:
(a) about 2% nootkatone ex valencene; and
(b) about 98% carrier.

11. The method of claim 9, wherein the carrier is a natural fertilizer, a chemical fertilizer, mulch, water, agrotextile, compost, topsoil, potting soil, vermiculite or soil amendments, an agricultural waste product, or a mixture thereof.

12. The method of claim 9, wherein the nootkatone ex valencene-containing composition is an about 5X, about 10X, about 20X, about 30X, or about 60X concentrate.

13. The method of claim 1, wherein the sap-sucking insect is one or more of an aphid, a thrips, a scale insect, a psyllid, a whitefly, a leafhopper, a stink bug, a tarnished plant bug, a squash bug, and a spider mite.

14. The method of claim 13, wherein the sap-sucking insect is an aphid.

\* \* \* \* \*